United States Patent [19]

Oikawa et al.

[11] Patent Number: 6,061,649

[45] Date of Patent: May 9, 2000

[54] SIGNAL ENCODING METHOD AND APPARATUS, SIGNAL DECODING METHOD AND APPARATUS AND SIGNAL TRANSMISSION APPARATUS

[75] Inventors: Yoshiaki Oikawa; Kyoya Tsutsui, both of Kanagawa; Shinji Miyamori; Masatoshi Ueno, both of Tokyo, all of Japan

[73] Assignee: Sony Corporation, Japan

[21] Appl. No.: 08/591,623

[22] PCT Filed: Jun. 12, 1995

[86] PCT No.: PCT/JP95/01172

§ 371 Date: Mar. 11, 1996

§ 102(e) Date: Mar. 11, 1996

[87] PCT Pub. No.: WO95/34956

PCT Pub. Date: Dec. 21, 1995

[30] Foreign Application Priority Data

Jun. 13, 1994 [JP] Japan .................................. 6-130695

[51] Int. Cl.⁷ ....................................................... G10L 3/02
[52] U.S. Cl. ............................................................. 704/226
[58] Field of Search ................................. 395/2.35, 2.38, 395/2.28, 2.32; 455/72; 704/207, 200, 226, 229, 223

[56] References Cited

U.S. PATENT DOCUMENTS

| | | | |
|---|---|---|---|
| 4,701,722 | 10/1987 | Dolby | 381/106 X |
| 5,115,240 | 5/1992 | Fujiwara et al. | 341/51 |
| 5,151,941 | 9/1992 | Nishiguchi et al. | 381/46 |
| 5,157,760 | 10/1992 | Akagiri | 395/2 |
| 5,241,603 | 8/1993 | Akagiri et al. | 381/37 |
| 5,264,846 | 11/1993 | Oikawa | 395/2.38 X |
| 5,293,450 | 3/1994 | Kane et al. | 395/2.35 |
| 5,295,225 | 3/1994 | Kane et al. | 395/2.35 |
| 5,311,561 | 5/1994 | Akagiri | 375/122 |
| 5,388,209 | 2/1995 | Akagiri | 395/2.38 |
| 5,438,643 | 8/1995 | Akagiri et al. | 395/2.1 |

(List continued on next page.)

FOREIGN PATENT DOCUMENTS

| | | | |
|---|---|---|---|
| 0421259 A2 | 4/1991 | European Pat. Off. | H04B 1/66 |
| 0458645 A2 | 11/1991 | European Pat. Off. | H04B 1/66 |
| 0506394 A2 | 9/1992 | European Pat. Off. | G10L 7/00 |
| 0525809 A2 | 2/1993 | European Pat. Off. | H04B 1/66 |
| 0649137A1 | 4/1994 | European Pat. Off. | G11B 20/10 |
| 0653846 A1 | 1/1995 | European Pat. Off. | H03M 7/30 |
| 63-110830 | 5/1988 | Japan | H04B 1/46 |
| WO94/24666 | 10/1994 | WIPO | G11B 20/10 |
| WO94/28633 | 12/1994 | WIPO | H03M 7/30 |
| WO95/13660 | 5/1995 | WIPO | H03M 7/30 |
| WO95/15032 A1 | 6/1995 | WIPO | H03M 7/30 |

OTHER PUBLICATIONS

IEICE Transactions vol. J71–A No. 2, Feb. 25, 1998 IEICE p. 443–452.

R.E. Crochiere, Digital Coding of Speech in Sub–bands, 55 Bell Syst. Tech J. No. 8 (1976).

(List continued on next page.)

*Primary Examiner*—David R. Hudspeth
*Assistant Examiner*—M. David Sofocleous
*Attorney, Agent, or Firm*—Limbach & Limbach L.L.P.

[57] ABSTRACT

With the signal encoding method and apparatus according to the present invention, noise components of plural channels are encoded individually by a first encoding unit 124, while noise components of plural channels are encoded in common by a second encoding unit 125. A discriminating unit 123 discriminates characteristics of noise components of plural channels. Based upon the results of discrimination, selective switching is made between an output of the first encoding unit 124 and an output of the second encoding unit 125. If the noise components of plural channels are encoded in common, the compression ratio for the noise components of plural channels may be improved. On the other hand, if the noise components of plural channels are not encoded in common, ill effects due to common handling can be prohibited.

50 Claims, 22 Drawing Sheets

U.S. PATENT DOCUMENTS

| | | | |
|---|---|---|---|
| 5,479,559 | 12/1995 | Fette et al. | 704/207 |
| 5,530,750 | 6/1996 | Akagiri | 395/2.38 X |
| 5,546,395 | 8/1996 | Sharma et al. | 395/2.28 X |
| 5,590,108 | 12/1996 | Mitsuno et al. | 369/59 |
| 5,602,961 | 2/1997 | Kolesnik et al. | 395/2.28 X |
| 5,621,856 | 4/1997 | Akagiri | 395/2.38 |
| 5,636,321 | 6/1997 | Tsutsui | 395/2.14 |
| 5,642,111 | 6/1997 | Akagiri | 341/50 |
| 5,664,056 | 9/1997 | Akagiri | 704/229 |
| 5,680,130 | 10/1997 | Tsutsui et al. | 341/87 |
| 5,717,821 | 2/1998 | Tsutsui et al. | 395/2.14 |
| 5,737,718 | 4/1998 | Tsutsui | 704/205 |
| 5,737,720 | 4/1998 | Miyamori et al. | 704/229 |
| 5,781,586 | 7/1998 | Tsutsui | 375/241 |

OTHER PUBLICATIONS

J.E. Rothweiler, "Polyphase Quadrature Filters—A New Subband Coding Technique", Boston, ICASSP 1987.

J. P. Princen and A.B. Bradley, "Subband Transform Coding Using Filter Bank Based on Time Domain Aliasing Cancellation", ICASSP 1987.

M.A. Krassner, The Critical Band Encoder—Digital Encoding of the Perceptual Requirements of the Auditory System, ICASSP 1980.

Rainer Zelinski and Peter Noll, Adaptive Transform Coding of Speech Signals, IEE Transactions on Acoustics, Speech, and Signal Processing, vol. ASSP. 25, No. 4, Aug. 1977.

G. Theile et al., "Low Bit–Rate Coding of High–Quality Audio Signals; An Introduction to the Mascam System," EBU Technical Review, No. 230, Aug. 1988, Brussels, pp. 158–181.

SIGNAL ENCODING METHOD AND APPARATUS, SIGNAL DECODING METHOD AND APPARATUS AND SIGNAL TRANSMISSION APPARATUS

TECHNICAL FIELD

This invention relates to a signal encoding method and apparatus for encoding input signals, such as audio data, by high-efficiency encoding, a recording medium having the high-efficiency encoded data recorded thereon, a signal transmitting method for transmitting the high-efficiency encoded signals and a signal decoding method and apparatus for decoding the encoded signals transmitted over a transmission channel or reproduced from a recording medium.

BACKGROUND OF THE INVENTION

There are a variety of techniques for high efficiency encoding of audio or speech signals. Examples of these techniques include transform coding in which a frame of digital signals representing the audio signal on the time axis is converted by an orthogonal transform into a block of spectral coefficients representing the audio signal on the frequency axis, and a sub-band coding in which the frequency band of the audio signal is divided by a filter bank into a plurality of sub-bands without forming the signal into frames along the time axis prior to coding. There is also known a combination of sub-band coding and transform coding, in which digital signals representing the audio signal are divided into a plurality of frequency ranges by sub-band coding, and transform coding is applied to each of the frequency ranges.

Among the filters for dividing a frequency spectrum into a plurality of equal-width frequency ranges include the quadrature mirror filter (QMF) as discussed in R. E. Crochiere, Digital Coding of Speech in Sub-bands, 55 Bell Syst. Tech J. No. 8 (1976). With such QMF filter, the frequency spectrum of the signal is divided into two equal-width bands. With the QMF, aliasing is not produced when the frequency bands resulting from the division are subsequently combined together.

In "Polyphase Quadrature Filters—A New Subband Coding Technique", Joseph H. Rothweiler ICASSP 83, Boston, there is shown a technique of dividing the frequency spectrum of the signal into equal-width frequency bands. With the present polyphase QMF, the frequency spectrum of the signals can be divided at a time into plural equal-width frequency bands.

There is also known a technique of orthogonal transform including dividing the digital input audio signal into frames of a predetermined time duration, and processing the resulting frames using a discrete Fourier transform (DFT), discrete cosine transform (DCT) and modified DCT (MDCT) for converting the signal from the time axis to the frequency axis. Discussions on MDCT may be found in J. P. Princen and A. B. Bradley, Subband Transform Coding Using Filter Bank Based on Time Domain Aliasing Cancellation", ICASSP 1987.

By quantizing the signals divided on the band basis by the filter or orthogonal transform, it becomes possible to control the band subjected to quantization noise and psychoacoustically more efficient coding may be performed by utilizing the so-called masking effects. If the signal components are normalized from band to band with the maximum value of the absolute values of the signal components, it becomes possible to effect more efficient coding.

In a technique of quantizing the spectral coefficients resulting from an orthogonal transform, it is known to use sub bands that take advantage of the psychoacoustic characteristics of the human auditory system. That is, spectral coefficients representing an audio signal on the frequency axis may be divided into a plurality of critical frequency bands. The width of the critical bands increase with increasing frequency. Normally, about 25 critical bands are used to cover the audio frequency spectrum of 0 Hz to 20 kHz. In such a quantizing system, bits are adaptively allocated among the various critical bands. For example, when applying adaptive bit allocation to the spectral coefficient data resulting from MDCT, the spectral coefficient data generated by the MDCT within each of the critical bands is quantized using an adaptively allocated number of bits.

There are presently known the following two bit allocation techniques. For example, in IEEE Transactions of Acoustics, Speech and Signal Processing, vol. ASSP-25, No. 4, August 1977, bit allocation is carried out on the basis of the amplitude of the signal in each critical band. This technique produces a flat quantization noise spectrum and minimizes the noise energy, but the noise level perceived by the listener is not optimum because the technique does not effectively exploit the psychoacoustic masking effect.

In the bit allocation technique described in M. A. Krassner, The Critical Band Encoder-Digital Encoding of the Perceptual Requirements of the Auditory System, ICASSP 1980, the psychoacoustic masking mechanism is used to determine a fixed bit allocation that produces the necessary signal-to-noise ratio for each critical band. However, if the signal-to-noise ratio of such a system is measured using a strongly tonal signal, for example, a 1 kHz sine wave, non-optimum results are obtained because of the fixed allocation of bits among the critical bands.

For overcoming these inconveniences, a high efficiency encoding apparatus has been proposed in which the total number of bits available for bit allocation is divided between a fixed bit allocation pattern pre-set for each small block and a block-based signal magnitude dependent bit allocation, and the division ratio is set in dependence upon a signal which is relevant to the input signal such that the smoother the signal spectrum, the higher becomes the division ratio for the fixed bit allocation pattern.

With this technique, if the energy is concentrated in a particular spectral component, as in the case of a sine wave input, a larger number of bits are allocated to the block containing the spectral component, for significantly improving the signal-to-noise characteristics in their entirety. Since the human auditory system is highly sensitive to a signal having acute spectral components, this technique may be employed for improving the signal-to-noise ratio for improving not only measured values but also the quality of the sound as perceived by the ear.

In addition to the above techniques, a variety of other techniques have been proposed, and the model simulating the human auditory system has been refined, such that, if the encoding device is improved in its ability, encoding may be made with higher efficiency in consideration of the human auditory system.

With the above-described conventional methods, the bandwidth for which frequency components are quantized is fixed, so that, if spectral components are concentrated in the vicinity of several specified frequencies, and these spectral components have to be quantized with a sufficient number of quantization steps, a larger number of bits need to be allocated to spectral components belonging to the same band as that of the spectral components concentrated in a few frequencies, resulting in the lower efficiency.

In general, the noise contained in tonal acoustic signals in which the energy of spectral components is concentrated in a particular frequency proves a serious obstruction to the hearing sense in that it is more readily heard by the ears than the noise added to acoustic signals whose energy is smoothly distributed over a broad frequency range. In addition, if spectral components having a large energy, that is tonal components, are not quantized with sufficient quantization steps, frame-to-frame distortion becomes significant when these spectral components are restored into waveform signals on the time axis so as to be synthesized with forward and backward frames. That is, significant connection distortion occurs when the waveform signal on the time axis is combined with the waveform signal of adjacent frames. The result is again the serious obstruction to ears. Thus it has been difficult with the conventional method to improve the encoding efficiency for the tonal components without deteriorating the sound quality.

The present Assignee already proposed in PCT/J 94/00880 (International Publication No. WO94/28633, date of international publication, Dec. 8, 1994 a technique of separating the input acoustic signal into tonal components having the energy concentrated in a specific frequency component and components having the energy smoothly distributed in a broader frequency range, that is noisy or non-tonal components, and encoding the respective components for achieving a high encoding efficiency.

With the previously proposed method, the input audio signal is transformed into frequency-domain components which are then grouped in, for example, critical bands. The spectral components are then divided into tonal components and noisy or non-tonal components. The tonal components, that is spectral components within an extremely narrow range on the frequency spectrum where the tonal components exist are encoded with high efficiency by normalization and quantization. The above-mentioned extremely narrow range on the frequency axis where the tonal components encoded with high efficiency encoding exist may be exemplified by a range consisting of a pre-set number of spectral components which themselves are tonal components and are centered about a spectral component having a locally maximum energy.

FIG. 1 shows a configuration of an encoder for adaptively encoding tonal components and noise components separated from the spectral components of audio signals.

In FIG. 1, an audio waveform signal is fed to a terminal 600. The audio waveform signal is converted by a transform circuit 601 into signal frequency components which are fed to a signal component separating circuit 602.

The signal component separating circuit 602 separates the signal frequency components from the transform circuit 601 into tonal components having a steep spectral distribution and other signal frequency components, that is noise components having a flatter spectral distribution. Of the frequency components, the tonal components having the steep spectral distribution and the other signal frequency components, that is noise components having a flatter spectral distribution, are encoded by normalization and quantization by a tonal component encoding circuit 603 and by a noise component encoding circuit 604, respectively.

Outputs of the tonal component encoding circuit 603 and the noise component encoding circuit 604 are converted by a code string generating circuit 605 into a code string which is outputted at an output terminal 607. The code string generating circuit 605 appends the number of information data of the tonal components supplied from the signal component separating circuit 602 and the position information thereof to the code string.

An output signal of the output terminal 607 is added to by an error correction code by an ECC encoder and modulated by eight-to-fourteen (8–14) modulation before being recorded by a recording head on e.g., a disc-shaped recording medium or a motion picture film.

FIG. 2 shows a decoder as a counterpart of the encoder shown in FIG. 1

Referring to FIG. 2, a code string reproduced from a recording medium, such as a disc-shaped recording medium or a motion picture film, not shown, by a playback head, demodulated and corrected for errors, is supplied to an input terminal 700.

The code string, thus supplied to the input terminal 700, is supplied to a code string resolving circuit 701, which then recognizes, based upon the number of information data of the tonal components in the error-corrected code string, which portion of the code string is the tonal component code, and separates the input code string into a tonal component code portion and a noise component code portion. Also the code string separating circuit 701 separates the position information of the tonal components from the input code string and outputs the position information to a downstream side synthesizing circuit 704.

The tonal component code portion and the noise component code portion are fed to a tonal component decoding circuit 702 and a noise component decoding circuit 703 so as to be dequantized and denormalized by way of decoding. Decoded signals from the tonal component decoding circuit 702 and a noise component decoding circuit 703 are routed to a synthesis circuit 704 which effects synthesis as a counterpart operation of the separation by the signal component separating circuit 602 of FIG. 1.

The synthesis circuit 704 adds the decoded signal of the tonal component at a pre-set position of the decoded signal of the noise component based upon the position information of the tonal component supplied from the code string separating circuit 701 for synthesizing the noise component and the tonal component on the frequency axis.

The synthesized decoded signal is transformed by an inverse transform circuit 705 which effects an inverse operation to that of the transform circuit 601 of FIG. 1 so as to be restored from the frequency axis to the time axis. An output waveform signal is outputted at a terminal 707.

FIG. 3 shows an illustrative configuration of the transform circuit 601 of FIG. 1.

Referring to FIG. 3, a signal supplied via a terminal 300, that is a signal via terminal 600 of FIG. 1, is split into three bands by two-stage band-dividing filters 301, 302. The signal via a terminal 300 is thinned by the band-dividing filter 301 by ½, while the signal thus thinned by ½ by the band-dividing filter 301 is further thinned by ½ by the band-dividing filter 302 (the signal at terminal 300 is thinned by ¼). That is, the bandwidth of two signals from the band-dividing filter 302 is one-fourth that of the signal at the terminal 300.

The signals of the three bands from the band-dividing filters 301, 302 are converted into spectral signal components by forward orthogonal transform circuits 303, 304 and 305, such as MDCT circuits. Outputs of these transform circuits 303, 304, 305 are fed via terminals 306, 307, 308 to the first signal component separating circuit 602.

FIG. 4 shows the basic configuration of the tonal component encoding circuit 603 and the noise component encoding circuit 604 of FIG. 1. These circuits are collectively termed signal component encoding circuits 603, 604.

Referring to FIG. 4, an output of the signal component separating circuit 602 of FIG. 1, fed to a terminal 310, is normalized by a normalization circuit 311 from one pre-set band to another and thence supplied to a quantization circuit 313. For normalization, a scale factor is determined for each pre-set band of the frequency components (termed herein an encoding unit since it is a unit of encoding). The scale factor is set so as to be equal to the amplitude of the maximum sample (frequency component) in the encoding unit and each of the entire samples in the encoding unit of the band is divided by the scale factor by way of normalization. The signal supplied to the terminal 310 is also fed to a quantization step decision circuit 312.

The quantization circuit 313 quantizes the signal from the normalization circuit 311 based upon the quantization step information calculated by the quantization step decision circuit 312. An output of the normalization circuit 311 is outputted at a terminal 314 and thence supplied to the code string generating circuit 605 of FIG. 1. In the output signal at the terminal 314, there are contained, in addition to the signal components quantized by the quantization circuit 313, the normalization coefficient information at the normalization circuit 311 and the quantization step information at the quantization step decision circuit 312.

FIG. 5 shows an illustrative configuration of the inverse transform circuit 705 of FIG. 2.

The configuration of FIG. 5 corresponds to the configuration of the circuit shown in FIG. 3. The signals supplied from the synthesis circuit 704 of FIG. 2 via terminals 501, 502 and 503 are transformed by inverse orthogonal transform circuits 504, 505, 506 which perform an operation reversed from the forward orthogonal transform shown in FIG. 3. The signals of the respective bands, obtained by the inverse orthogonal transform circuits 504, 505, 506, are synthesized by two-stage band-synthesizing filters.

That is, outputs of the inverse orthogonal transform circuits 505, 506 are sent to and synthesized by a band-synthesizing filter 507, an output of which is synthesized by a band synthesizing filter 508 with an output of the inverse orthogonal transform circuit 508. An output of the band synthesizing filter 508 is outputted at a terminal 509 (terminal 707 of FIG. 2).

In a majority of cases, acoustic signals are processed as plural-channel signals. Referring to FIG. 6, a configuration of encoding plural channel signals is explained.

Referring to FIG. 6, audio signals of plural channels ($ch_1$, $ch_2$, . . . , $ch_n$) are fed via input terminals $30_1$ to $30_n$ associated with respective channels to sampling and quantization units, that is analog/digital converters $31_1$ to $31_n$ similarly associated with respective channels. These sampling and quantization units $31_1$ to $31_n$ convert the audio signals of the respective channels into quantized signals. The quantized signals from these sampling and quantization units $31_1$ to $31_n$ are routed to encoding units $32_1$ to $32_n$. The signals encoded by the encoding units $32_1$ to $32_n$ are routed to a formatter 33 which then assembles the encoded plural-channel signals into a bitstream for transmission or recording on a recording medium in accordance with a pre-set format. The bitstream is outputted at an output terminal 34 so as to be recorded on a recording medium or transmitted.

FIG. 7 shows a configuration of a decoder for decoding the encoded multi-channel signals.

Referring to FIG. 7, the encoded signals, reproduced from the recording medium or transmitted, are routed via an input terminal 40 to a deformatter 41. The deformatter 41 resolves the bitstream supplied thereto into channel-based encoded signals in accordance with a pre-set format. The channel-based encoded signals are routed to decoding units $42_1$ to $42_n$ associated with respective channels.

These decoding units $42_1$ to $42_n$ decode the channel-based encoded signals. The signals decoded by the decoding units $42_1$ to $42_n$ are converted into analog signals by D/A converters $43_1$ to $43_n$. These analog signals are outputted at associated output terminals $44_1$ to $44_n$ as decoded signals of channels $ch_1$ to $ch_n$.

There exist a number of encoding methods for encoding plural-channel signals in addition to the encoding method explained with reference to FIG. 6. For example, there is disclosed in JP Patent Kokai Publication JP-A-4-360331 a method for efficient compression of sub-band signals of left subband and right subband signals of stereo signals (2-channel signals) by exploiting characteristics of the human hearing mechanism that the waveform of monaural signal instead of its phase difference plays an important role. There is also disclosed in International Publication Number WO92/12607 a technique of encoding and decoding sub-bands of signals representing a sound field in connection with recording, transmission and reproduction of a multi-dimensional sound field intended to be heard by the hearer. The decoded signals of these subbands are transported by multiplexed individual signals or synthesized signals along with a control signal transmitting the relative level of the encoded signals or the definite azimuth of the sound field represented by the encoded signal. These techniques compress the signals using characteristics among respective channels.

If the above-described technique of converting the signal into frequency components and separating the resulting frequency components into tonal components and noise components for encoding can be applied to encoding of multi-channel signals using characteristics across the respective channels, the information volume can be compressed further in recording or transmitting multi-channel signals on a recording medium of limited recording capacity or on a transmission medium of limited transmission capacity. However, there lacks up to now a concrete proposal in connection with such technique.

In view of the foregoing, it is an object of the present invention to provide a signal encoding method and apparatus whereby the date volume in encoding plural-channel signals may be diminished while decoded signals may be prohibited from being deteriorated, a corresponding signal decoding method and apparatus, a recording medium on which encoded signals are recorded, and a method for transmitting the encoded signals.

SUMMARY OF THE INVENTION

In view of the foregoing, the present invention provides a signal encoding method for encoding input signals of plural channels by transforming the input signals into frequency components, separating the frequency components into first signals made up of tonal components and second signals made up of other components and encoding the first and second signals. the signal encoding method includes the steps of detecting characteristics of the second signals of plural channels and encoding the second signals of plural channels by handling them in common based upon the results of detection.

The present invention also provides a signal encoding apparatus for encoding input signals of plural channels by transforming the input signals into frequency components, separating the frequency components into first signals made up of tonal components and second signals made up of other components and encoding the first and second signals. The encoding apparatus includes means for detecting characteristics of the second signals of plural channels and means for encoding the second signals of plural channels by handling them in common based upon the results of detection.

With the signal encoding method and apparatus of the present invention, selective switching is carried out based upon the results of detection between individual encoding for encoding the second signal of plural channels and common encoding for encoding the second signals of plural channels. The second signals handled in common for plural channels are further separated into third signals made up of tonal components and fourth signals made up of other components. The selective switching between the individual encoding and the common encoding based upon the results of detection is carried out from one pre-set encoding unit to another. The characteristics are detected based upon the information on the sum of widths of the second signal components in the pre-set encoding unit and the information on the width of the encoding unit.

The present invention also provides a signal decoding method for decoding an encoded signal encoded from first signals of plural channels made up of tonal components and an encoded signal encoded in common from second signals of plural channels made up of other components based upon the results of detection of characteristics of the second signals of plural channels. The first and second signals are separated from frequency components of plural channels. The signal decoding method includes the steps of decoding the encoded first signal of plural channels, and decoding the encoded second signal of plural channels based upon the results of detection of the signals characteristics at the time of encoding.

The present invention also provides a signal decoding apparatus for decoding an encoded signal encoded from first signals of plural channels made up of tonal components and an encoded signal encoded in common from second signals of plural channels made up of other components based upon the results of detection of characteristics of the second signals of plural channels. The first and second signals are separated from frequency components of plural channels. The signal decoding apparatus includes first decoding means for decoding the encoded first signal of plural channels, and second means for decoding the encoded second signal of plural channels based upon the results of detection of the signals characteristics at the time of encoding.

With the signal decoding method and apparatus of the present invention, the encoded second signals are signals derived from selective switching between the common encoding of second signals of plural channels and individual encoding of second signals of plural channels based upon the results of detection of the signal characteristics of the second signals of plural channels. For decoding the encoded second signals, selective switching is made between decoding of common encoded signals and decoding of individually encoded signals based upon the result of detection of signal characteristics at the time of decoding. The encoded second signals are signals encoded after separation of the common-handled second signals in plural channels into third signals made up of tonal components and fourth signals made up of other components, and the encoded second signals are decoded by decoding the third signals and the fourth signals made up of other components. Selective switching between the individual decoding and the common encoding is done from one pre-set encoding unit to another.

The present invention also provides a recording medium in which there are recorded, along with encoded signals of first signals made up of tonal signals, encoded signals of second signals made up of other components, which first and second signals having been separated from frequency components transformed from input signals of plural channels. The second signals are encoded in common based upon results of detection of characteristics thereof.

The present invention also provides a signal transmitting method for transmitting input signals of plural channels by transforming the input signals into frequency components, separating the frequency components into first signals made up of tonal components and second signals made up of other components and encoding the first and second signals. The signal transmitting method includes the steps of transmitting first encoded signals obtained on encoding the first signals of plural channels from one channel to another, transmitting second encoded signals obtained on encoding the second signals of plural channels or third encoded signals obtained on common encoding of the second signal of plural channels, and transmitting the information indicating whether or not the second signal of plural channels have been encoded in common.

With the signal encoding method and apparatus of the present invention, since the second signals of plural channels are handled in common, based upon the results of detection of characteristics of the second signals of plural characteristics, the compression ratio for the second signals of plural channels can be improved by encoding the second signals handled in common.

With the signal decoding method and apparatus of the present invention, decoded signals may be regenerated from the signals encoded by the signal encoding method and apparatus by decoding the encoded first signals of the respective channels and by decoding the common-handled second signals based upon the results of detection of characteristics at the time of encoding.

With the recording medium of the present invention, the recording capacity may be exploited effectively since the signals encoded by the signal encoding method and apparatus of the present invention are recorded thereon.

With the signal transmitting method of the present invention, since the second signals of plural channels are handled in common, the compression ratio for the second signals of plural channels may be raised by encoding third signals obtained by handling the second signals in common.

DETAILED DESCRIPTION OF A PREFERRED EMBODIMENT

Figure 1:
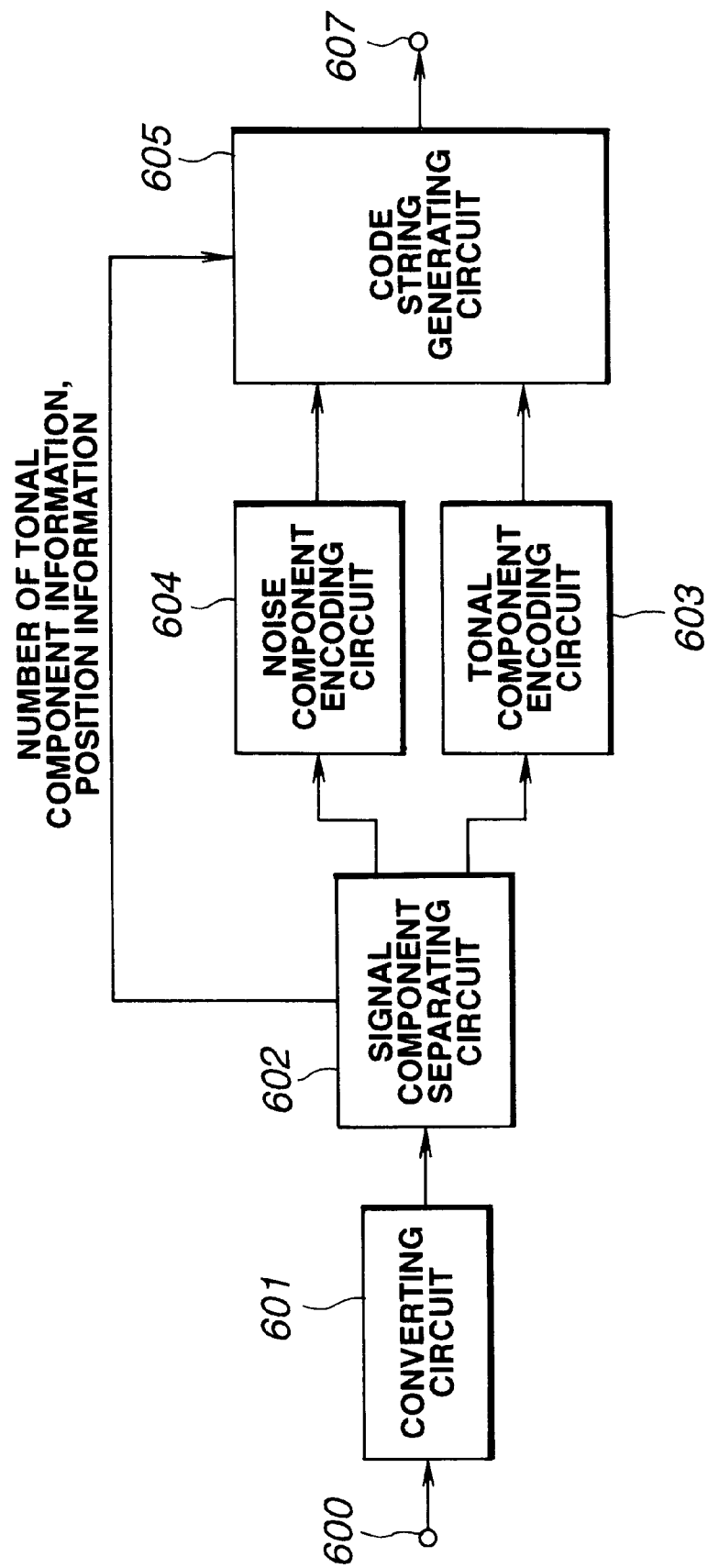
FIG. 1 is a block circuit diagram showing a basic construction of an encoder for encoding noise components and tonal components separated from spectral signals.

Referring to the drawings, preferred embodiments of the present invention will be explained in detail.

Figure 8:
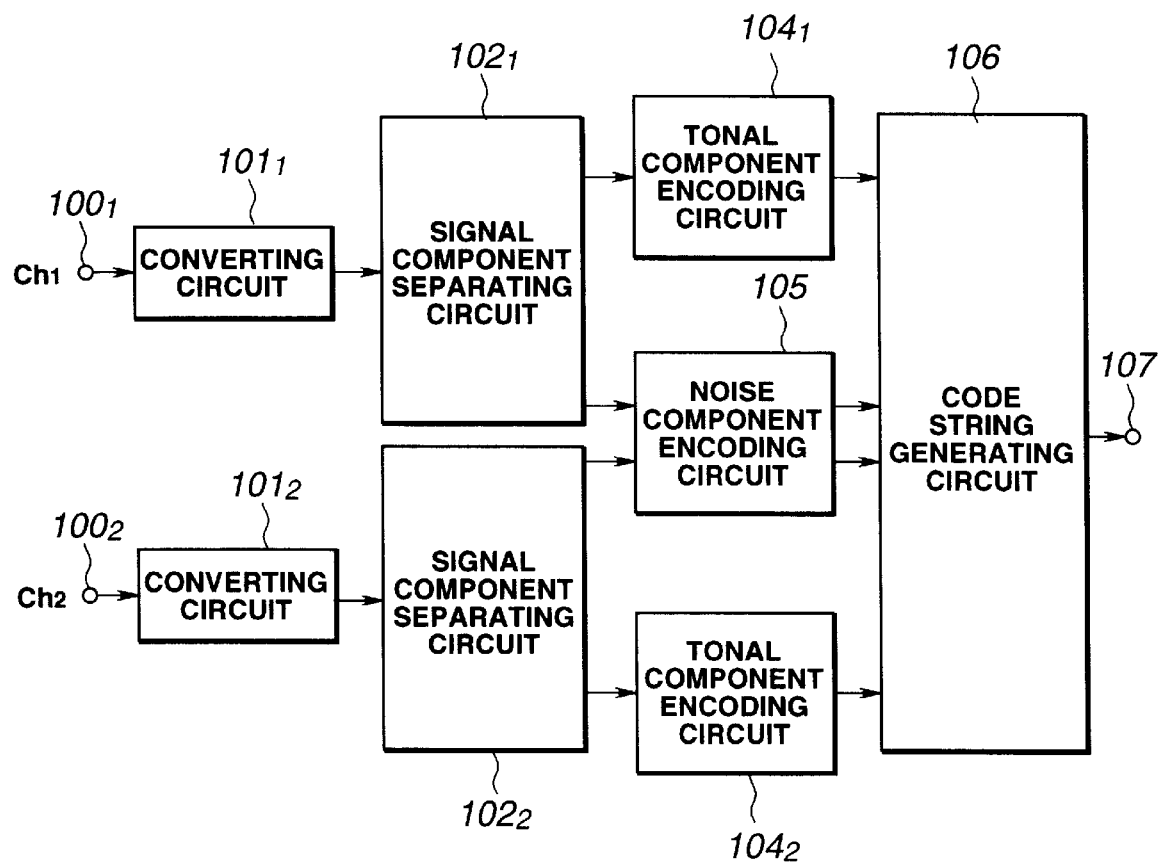
FIG. 8 is a schematic block circuit diagram showing a construction of an encoder embodying the present invention.

FIG. 8 shows a basic configuration of a signal encoder (encoding apparatus) for carrying out the signal encoding method of the present invention. In the embodiment shown in FIG. 8, left and right channels of stereo audio signals are taken as an example of plural channels.

That is, the signal encoder of the present embodiment includes transform circuits $101_1$, $101_2$ for transforming input signals of plural channels $ch_1$, $ch_2$, . . . , $ch_n$, and signal component separating circuits $102_1$, $102_2$ for separating the frequency components into first signals (tonal components) made up of tonal components and second signals (noise components) made up of other components. The signal encoder further includes tonal component encoding circuits $104_1$, $104_2$ for encoding tonal components of the plural channels $ch_1$, $ch_2$ and a noise component encoding circuit 105 for detecting characteristics of the noise components of the plural channels $ch_1$, $ch_2$ and encoding the noise components of the channels $ch_1$, $ch_2$ in common based upon the results of characteristics detection.

Figure 3:
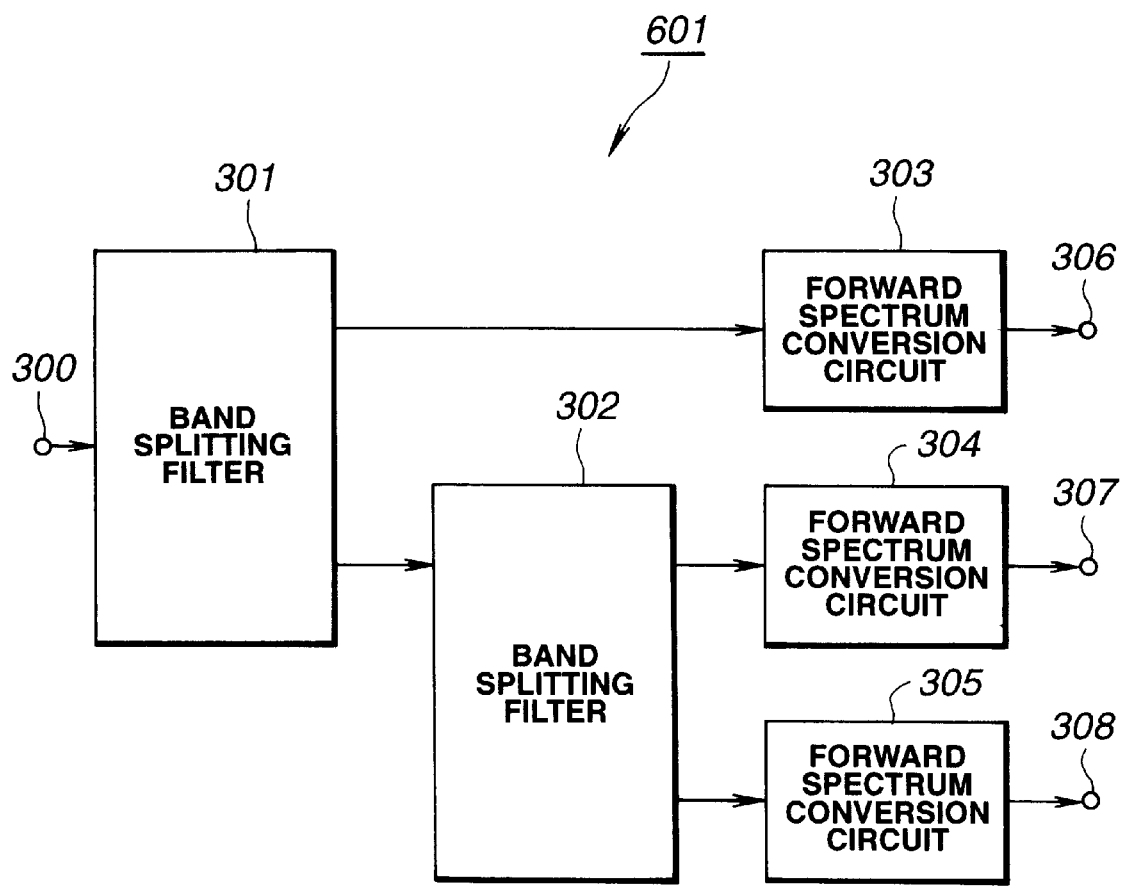
FIG. 3 . is a block circuit diagram showing a basic construction of a transform circuit.

Referring to FIG. 8, audio signals of the channel $ch_1$, such as a right channel, are supplied to a terminal $100_1$, while audio signals of the channel $ch_2$, such as a left channel, are supplied to a terminal $100_2$. The audio signals of the channels $ch_1$, $ch_2$ are supplied to transform circuits $101_1$, $101_2$, respectively. These transform circuits $101_1$, $101_2$ are similar in construction to the transform circuit 601 shown in FIG. 3.

The frequency components of the transform circuits $101_1$, $101_2$ are supplied to signal component separating circuits $102_1$, $102_2$, respectively. Similarly to the signal component separating circuit 602 of FIG. 1, these signal component separating circuits $102_1$, $102_2$ separate the frequency components supplied thereto into tonal components and noise components, respectively, as will be explained subsequently. The technique of separating the frequency components into tonal and noise components is discussed in detail in the above-referenced PCT/JP94/00880.

The tonal components separated by the signal component separating circuits $102_1$ are supplied to and encoded by the tonal component encoding circuit $104_1$, while the tonal components separated by the signal component separating circuits $102_2$ are supplied to and encoded by the tonal component encoding circuit $102_2$. The noise components of the respective channels, separated by the signal component separating circuits $102_1$, $102_2$, are both supplied to the noise component encoding circuit 105. The noise component encoding circuit 105 encode the noise components of the channels $ch_1$, $ch_2$ in common or otherwise, that is separately from each other, in dependence upon signal characteristics. The signal components, encoded by the tonal component encoding circuits $104_1$, $104_2$ and the noise component encoding circuit 105, are sent to a code string generating circuit 106. The position information of the tonal components of the respective channels are sent to the code string generating circuit 106, although signal line or the like is not shown.

The code string generating circuit 106 arrays the encoded signal components supplied thereto into a pre-set code string which is outputted at an output terminal 107. The output signal at the terminal 107 is added to with an error correction code at an ECC encoder and modulated by an EFM (eight-to-fourteen) modulation circuit before being recorded by a recording head on e.g., a disc-shaped recording medium or a motion picture film. The recording medium may be exemplified by a magneto-optical disc, a phase-transition disc or an IC card. The code string may also be transmitted by satellite broadcasting or a transmission channel, such as CATV.

Figure 9:
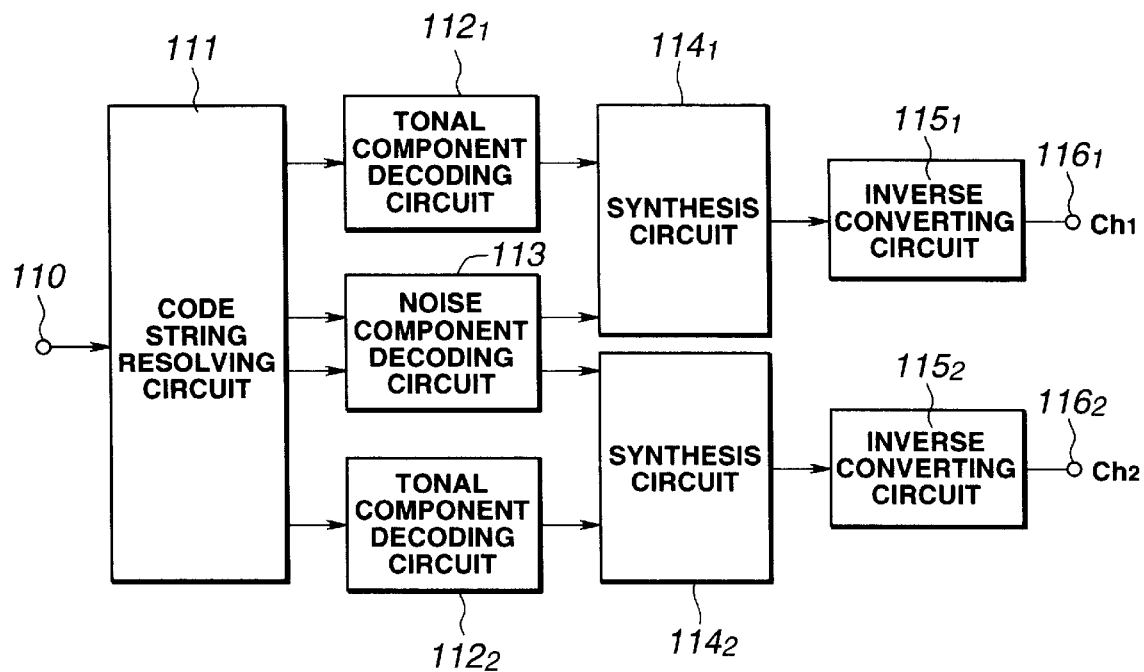
FIG. 9 is a schematic block circuit diagram showing a construction of a decoder embodying the present invention.

FIG. 9 shows a basic configuration of a signal decoder (decoding apparatus) which is a counterpart of the signal encoder shown in FIG. 8.

Referring to FIG. 9, a code string reproduced from a recording medium, such as a disc-shaped recording medium or a motion picture film, not shown, by a reproducing head, demodulated and corrected for errors, is fed to an input terminal 110.

Figure 2:
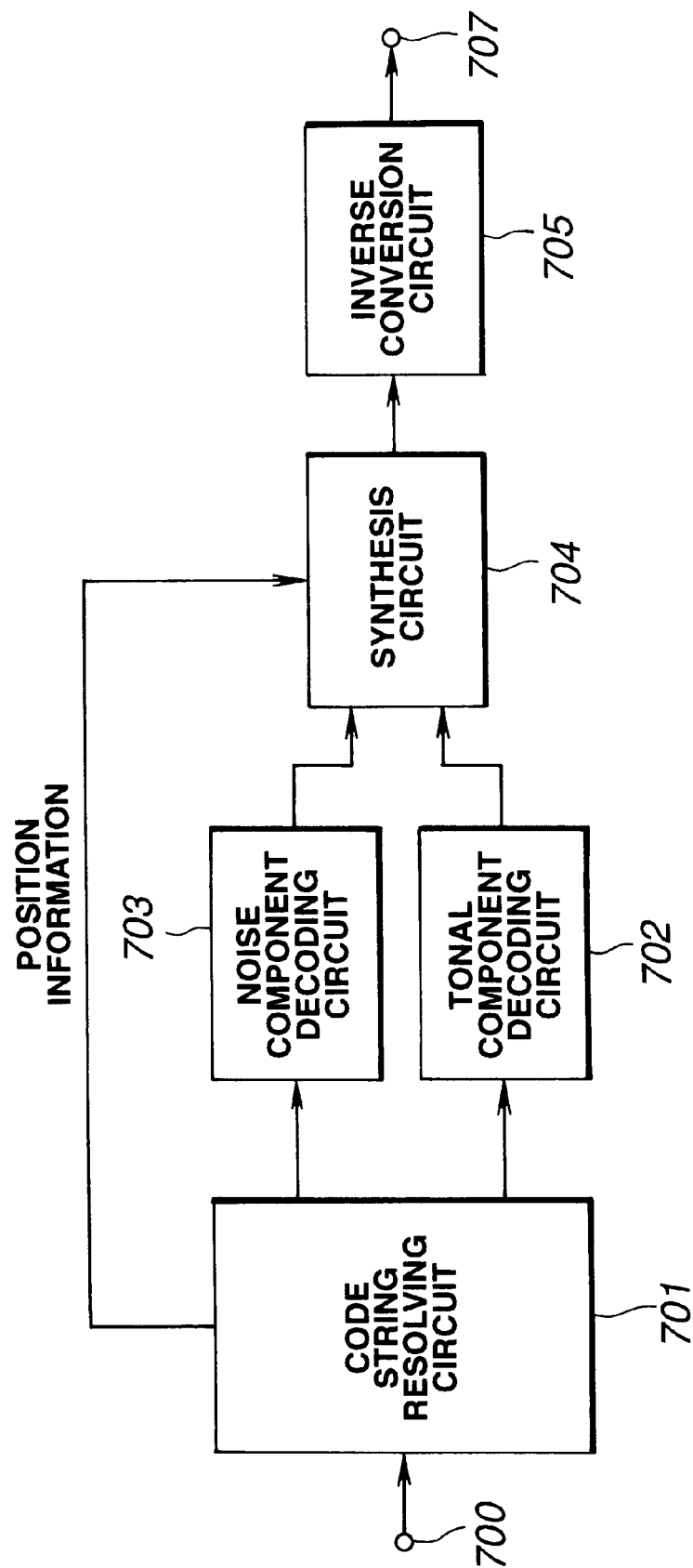
FIG. 2 is a block circuit diagram showing a basic construction of a decoder for decoding encoded signals obtained on encoding noise components and tonal components separated from spectral signals.

The code string supplied to the input terminal 110 is supplied to a code string resolving circuit 111. The code string resolving circuit 111 recognizes, based upon the number of tonal component information data for channels $ch_1$, $ch_2$ contained n the error-corrected code string, which portion of the code string of each channel is the tonal component code portion, and separates the tonal and noise components of the channels $ch_1$, $ch_2$ from each other. The position information of the tonal component code portion of each channel is sent to downstream synthesis circuits $114_1$, $114_2$, although the signal line is not shown as in FIG. 2.

The tonal component code portion for the channel $ch_1$ and the tonal component code portion for the channel $ch_2$ from the code string resolving circuit 111 are routed to the tonal component decoding circuits $112_1$, $112_2$ where they are decoded by dequantization and denormalization. The noise component code portion is sent to the noise component decoding circuit 113. If the noise component code portion has been encoded in common during previous encoding, such encoding in common is canceled by separation at the decoding circuit 113, at the same time as the code portion is dequantized and denormalized for decoding. If the noise component code portion has not been encoded in common during pervious encoding, the code portion is dequantized and denormalized at the decoding circuit 113 for decoding.

The tonal components for the channel $ch_1$, decoded by the tonal component decoding circuit 112, and the noise components for the channel $ch_1$, decoded by the noise component decoding circuit $112_1$, are sent to a synthesis circuit $114_1$. The tonal components for the channel $ch_2$, decoded by the tonal component decoding circuit $112_2$, and the noise components for the channel $ch_2$, decoded by the noise component decoding circuit 113, are sent to a synthesis circuit $114_2$.

The synthesis circuits $114_1$, $114_2$ sum the decoded signals of the tonal components of the respective channels at pre-set positions of the decoded signals of the noise components of the respective channels, based upon the position information of the tonal components of the respective channels, supplied from the code string resolving circuit 111, for synthesizing the noise and tonal components of the respective channels on the frequency axis.

Figure 5:
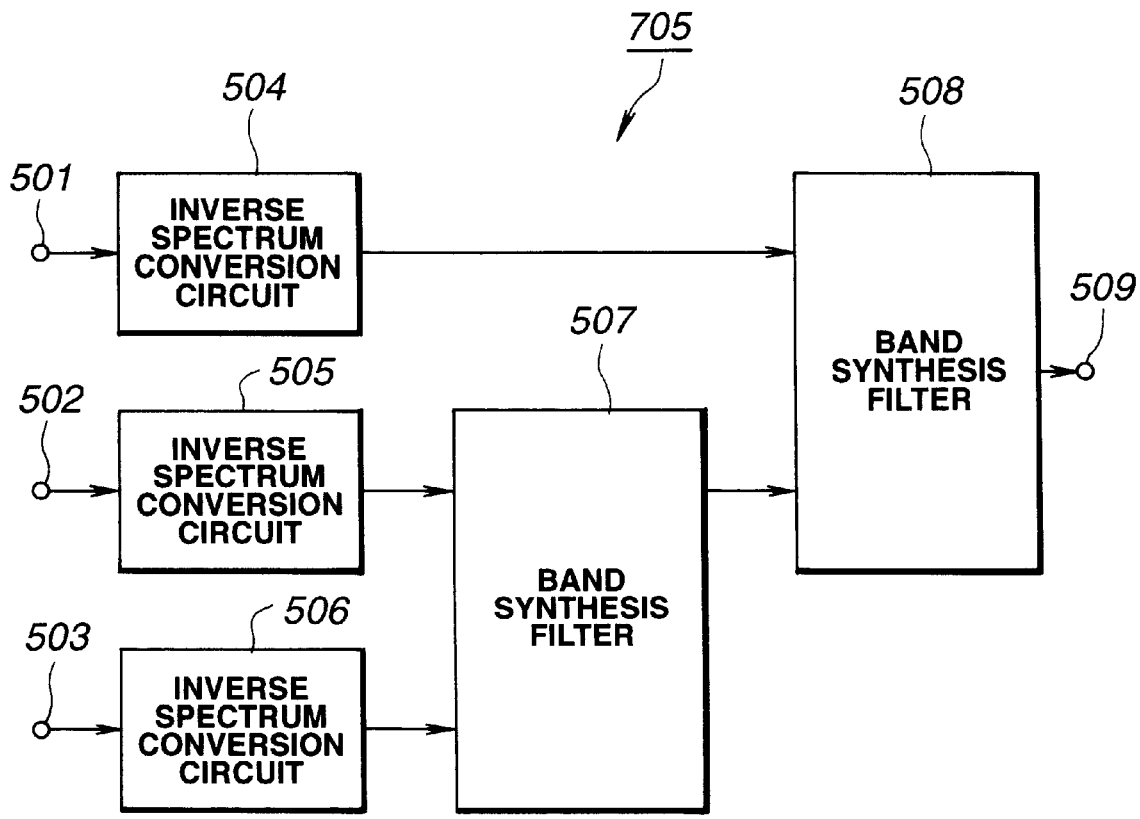
FIG. 5 is a block circuit diagram showing an illustrative construction of an inverse transform circuit.
Figure 6:
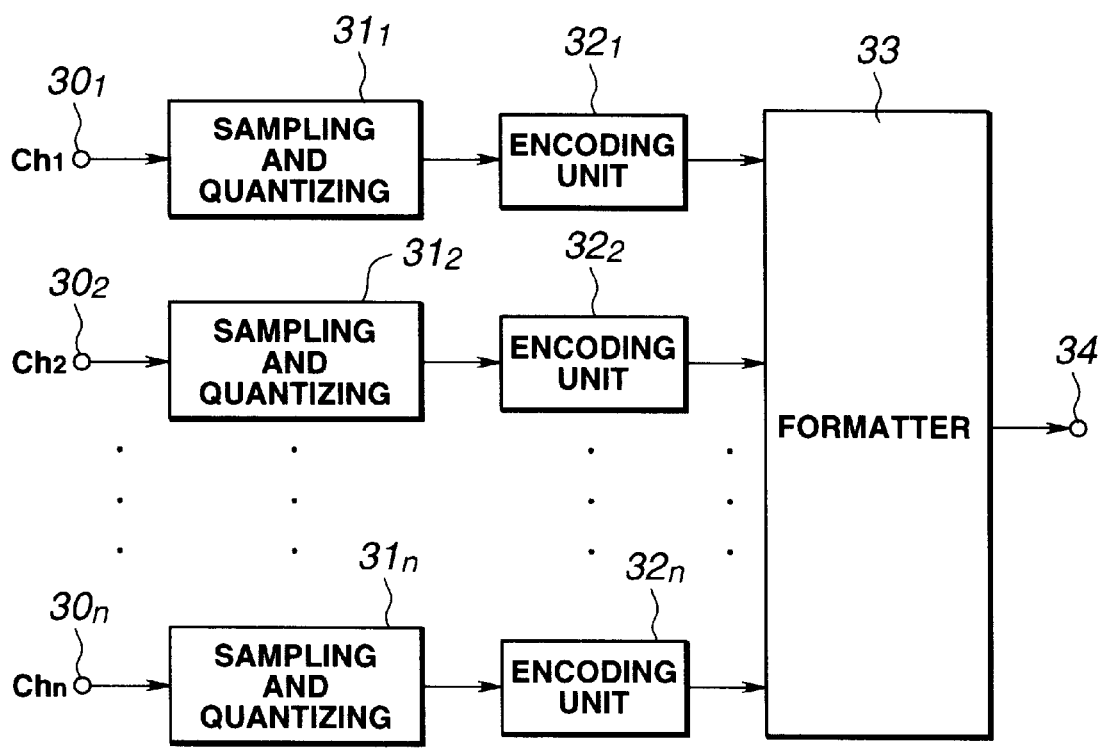
FIG. 6 is a schematic block circuit diagram showing a construction of an encoder for encoding on the channel basis.
Figure 7:
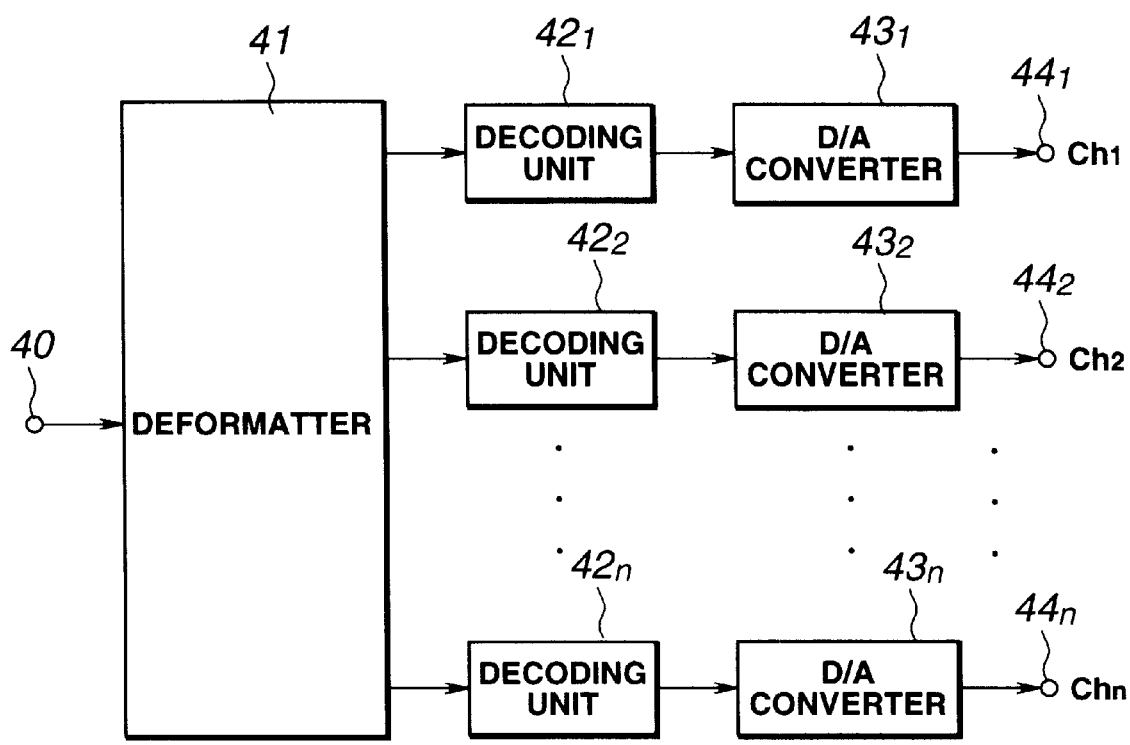
FIG. 7 is a schematic block circuit diagram showing a decoder for decoding encoded signals obtained on encoding on the channel basis.

The decoded signal for the channel $ch_1$, synthesized by the synthesis circuit $114_1$, is fed to an inverse orthogonal transform circuit $115_1$, while the decoded signal for the channel $ch_2$, synthesized by the synthesis circuit $114_2$, is fed to an inverse orthogonal transform circuit $115_1$. These inverse orthogonal transform circuits $115_1$, $115_2$ are configured similarly to those shown in FIG. 5. The waveform signals, restored by these inverse transform circuits $115_1$, $115_2$, are outputted at terminals $116_1$, $116_2$ associated with the respective channels.

Figure 10:
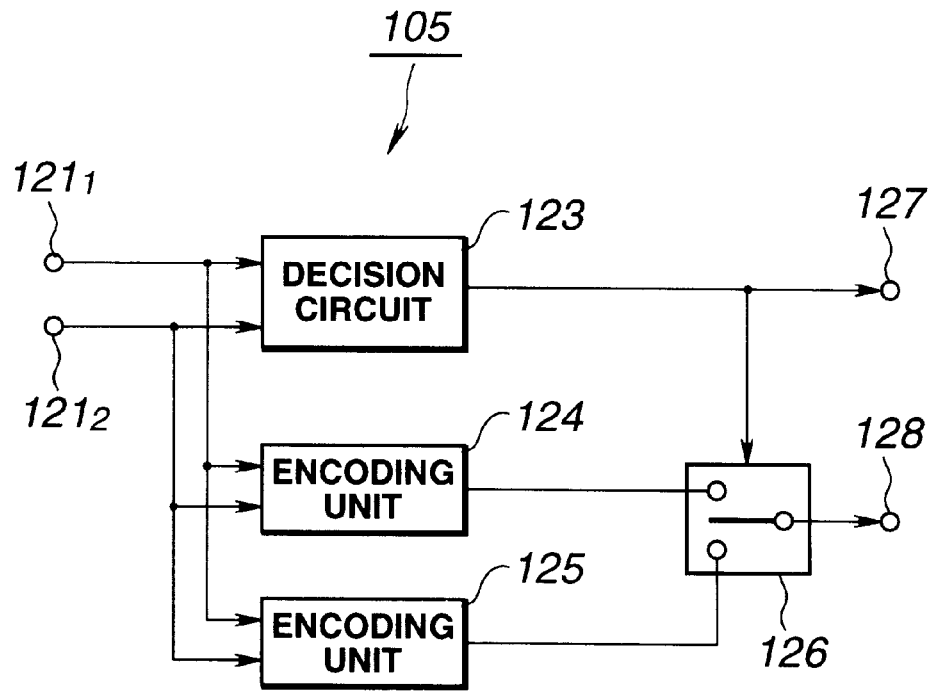
FIG. 10 is a block circuit diagram showing an illustrative construction of a noise component encoding circuit of the encoder embodying the present invention.

Referring to FIG. 10, an illustrative configuration of the noise component encoding circuit 105 of FIG. 8 is explained.

That is, the encoder of the present embodiment includes, as main components, a discrimination circuit 123 as means for detecting characteristics of noise components of plural channels, a first encoding unit 124 as individual encoding means for individually encoding noise components of plural channels, a second encoding unit 125 as means for common encoding of noise components of plural channels, and a changeover switch 126 as selection means for selectively switching between an output of the first encoding unit 124 and an output of the second encoding unit 125, based upon a discrimination output of the discrimination circuit 123, as shown in FIG. 10.

In this figure, the noise components for the channel $ch_1$ from the noise component separating circuit $102_1$ of FIG. 8 is supplied to a terminal $121_1$, while the noise components for the channel $ch_2$ from the noise component separating circuit $102_2$ is supplied to a terminal $121_2$.

The noise components of the respective channels are sent to the discrimination circuit 123, first encoding unit 124 and to the second encoding unit 125. The first encoding unit 124 directly encodes the noise components of the channels $ch_1$, $ch_2$ without encoding them in common, while the second encoding unit 125 encodes the noise components of the channels $ch_1$, $ch_2$ in common, as will be explained subsequently. The noise components of the respective channels, encoded by the first encoding unit 124, are sent to one of fixed input terminals of the changeover switch 126, while the noise components encoded in common by the second encoding unit 126 are sent to the other fixed input terminal of the changeover switch 126.

The discrimination circuit 123 controls the switching of the changeover switch 126 depending on characteristics of the supplied signals.

The discrimination circuit 123 effects discrimination based upon the number of tonal components in an encoding unit within a pre-set band. Since the number of the tonal components in the encoding unit corresponds to the sum of widths of the noise components left after extraction of the tonal components, such that, the larger the number of the tonal components, the less is the sum of the widths of the noise components, whereas, the smaller the number of the tonal components, the larger is the sum of the widths of the noise components, the discrimination may be said to be that based upon the sum of the widths of the noise components. Since the bandwidths of the encoding units correspond to those of critical bands which take into account the psychoacoustic characteristics of the human auditory system, such that the bandwidths differ from low to high frequency sides, the bandwidth information is utilized in effecting the discrimination which is based upon the sum of the widths of the noise components.

The tonal components are more important to the human hearing sense than the noise components. Thus it is desirable to allocate a sufficient number of bits to the tonal components. On the other hand, if there are many tonal components, the decoded acoustic signals based upon the noise components are substantially masked by those based upon the tonal components. Thus, if the noise components are handled in common for encoding, there is only minor ill effect on the human hearing sense. Thus, if there are many tonal components, that is if the sum of widths of the noise components is small, the noise components are handled in common in order to reduce the amount of bit allocation to the noise components and in order to procure bit allocation to the noise components. Conversely, if there is only a small number of tonal components, that is if the sum of the widths of the noise components is large, the amount of bit allocation to the tonal components is not increased excessively. Thus, in such case, the noise components are not handled in common and a larger number of bits are allocated to the respective noise components. Thus, if the ratio of the sum of the widths of the noise components of one of the channels $ch_1$, $ch_2$ to the bandwidth of the encoding unit is smaller than a pre-set threshold value, the discrimination circuit 123 sets the changeover switch 126 to the side of the second encoding unit 125 for taking out noise components encoded in common among different channels. If otherwise, the discrimination circuit 123 sets the changeover switch 126 to the side of the first discrimination unit 124 for taking out the noise components encoded from one channel to another.

That is, one or the other of fixed input terminals of the changeover switch 126 is selected in dependence upon a signal specifying the results of discrimination of the discrimination circuit 123, so that one or the other of encoded outputs of the first encoding unit 124 or the second encoding unit 125 is selected in dependence upon the results of discrimination based upon the above-mentioned characteristics of the human hearing sense.

An output of the changeover switch 126 is issued at a terminal 128 as an encoded signal of the noise components encoded without being in common or as an encoded signal of the noise components encoded in common, and transmitted to the code string generating circuit 106 of FIG. 8. The code string generating circuit 106 is also fed with the signal specifying the results of discrimination by the decision circuit 123.

Figure 11:
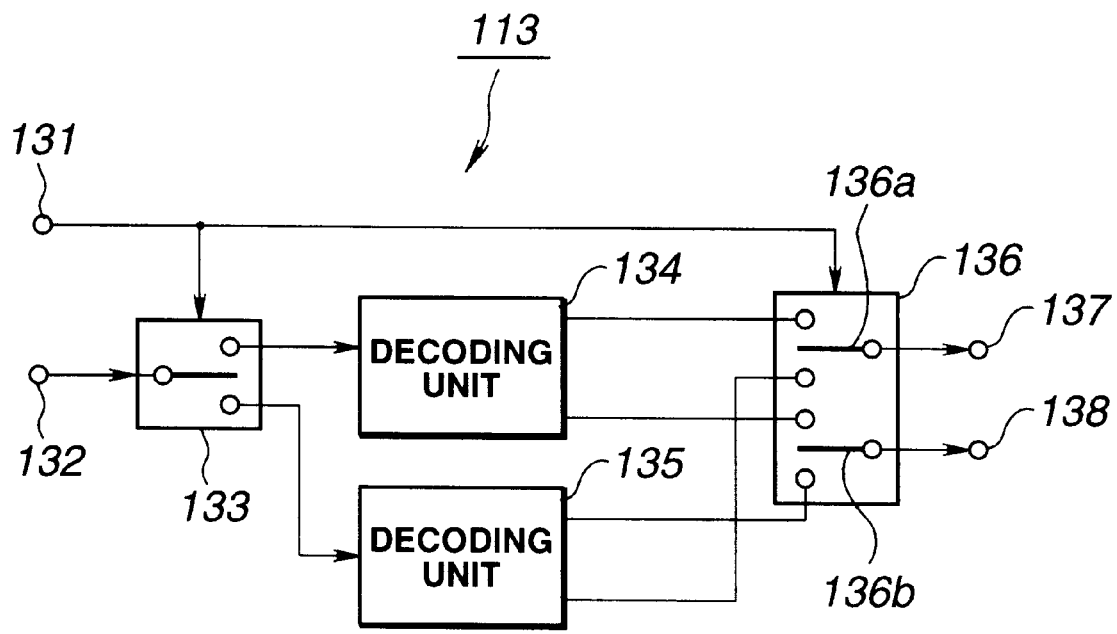
FIG. 11 is a block circuit diagram showing an illustrative construction of a noise component decoding circuit of the encoder embodying the present invention.

The noise component decoding circuit 113 of the signal decoder of FIG. 9, as a counterpart circuit of the noise component encoding circuit 105 of FIG. 10, is now explained. FIG. 11 shows an illustrative configuration of the noise component decoding circuit 113.

The signal decoder of the present embodiment includes, as main constituents, the noise component decoding circuit 113 configured as shown in FIG. 11, in addition to the tonal component decoding circuit 112 of FIG. 9 for decoding the channel-based encoded tonal components. Thus the decoder has a first decoding unit 134 for decoding noise components encoded individually, that is without being handled in common, and a second decoding unit 135 for decoding noise components encoded in common, that is noise components encoded by being handled in common. In addition, the decoder has changeover switches 133, 136 for selectively switching between outputs of the first decoding units 134 and the second decoding units 135 based upon results of detection of characteristics at the time of encoding, that is the signal specifying the results of discrimination of the discrimination circuit 123 of FIG. 10.

Referring to FIG. 11, the encoded noise components, separated from the code string by the code string resolving circuit 111 of FIG. 9, are sent via a terminal 132 to a changeover switch 133. The signal specifying the results of discrimination of the discrimination circuit 123 of FIG. 10, separated from the code string by the code string separating circuit 111, is sent via a terminal 131 to switching control terminals of the changeover switches 133, 136.

The changeover switch 133 is changed over depending upon the signal specifying the results of discrimination. That is, if the encoded noise components, supplied thereto via the terminal 132, are the noise components not handled in common, the changeover switch 133 sends the noise components via one of its fixed terminals to the first decoding units 134. If the encoded noise components, supplied thereto via the terminal 132, are the noise components handled in common, the changeover switch 133 sends the noise components via the other of its fixed terminals to the second decoding units 135. The first decoding unit 134 is a counterpart of the first encoding unit 124 of FIG. 10 and decodes the encoded noise components for the channels $ch_1$, $ch_2$ not handled in common. The second decoding unit 135 is a counterpart of the second encoding unit 125 of FIG. 10 and separates the noise components encoded in common into respective channels and decodes the channel-based noise components. The reversed sequence of separation and decoding to that shown above may also be employed. The decoded noise components for the channel $ch_1$ from the first and second decoding units 134, 135 are sent to one of the fixed terminals associated with the movable contacts 136a, 136b of the changeover switch 136. The decoded noise components for the channel $ch_2$ are sent to the other fixed terminals associated with the movable contacts 136a, 136b. The contacts 136a, 136b of the changeover switch 136 are interlocked with each other for effecting selective switching responsive to the signal of the results of discrimination supplied via the terminal 131. Outputs of the contacts 136a, 136b are issued at terminals 137, 138 as noise components for the channels $ch_1$ and $ch_2$, respectively. These outputs at the output terminals 137, 138 are respectively sent to synthesis circuits $114_1$, $114_2$ of FIG. 9.

Figure 12:
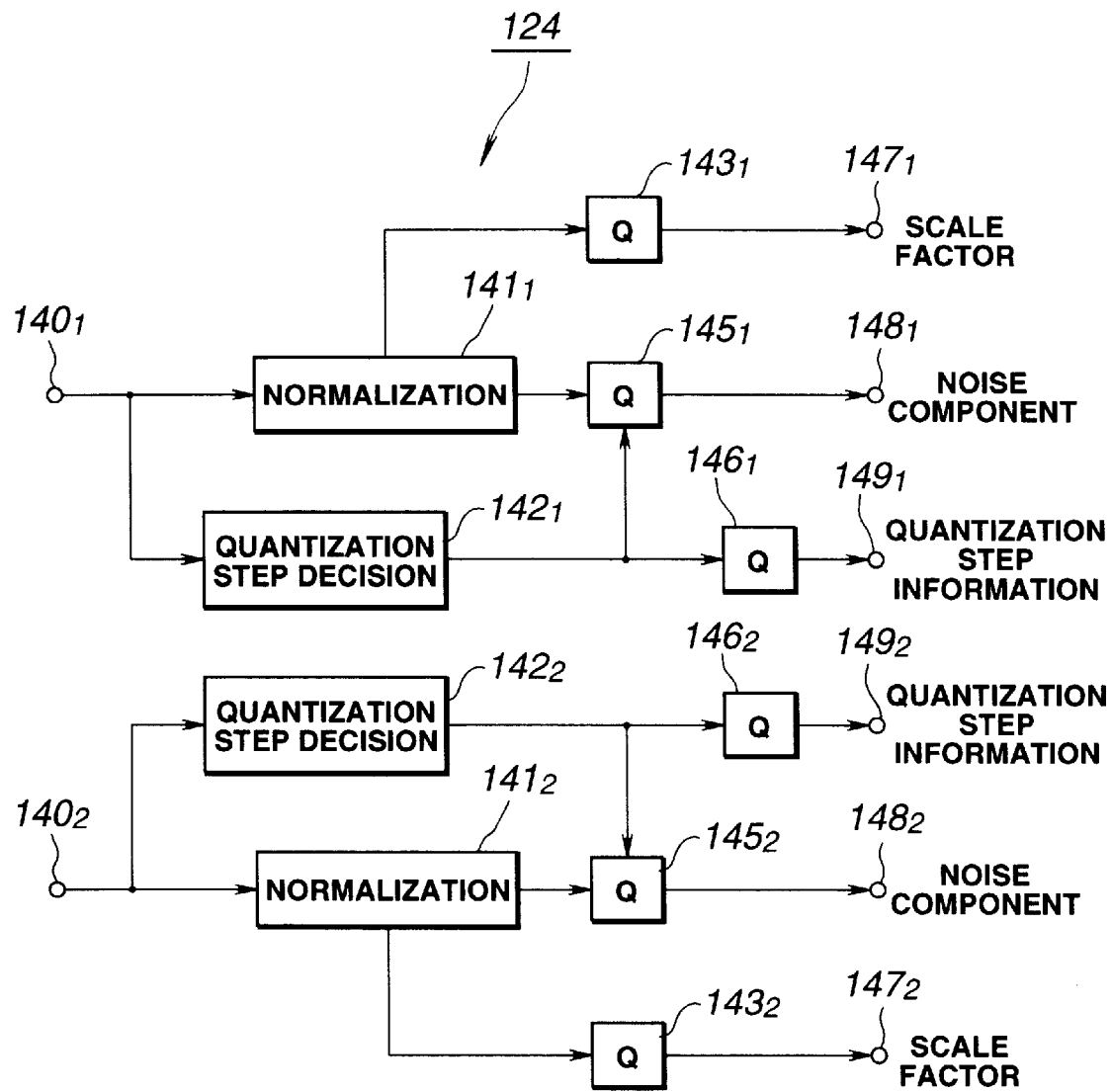
FIG. 12 is a block circuit diagram showing an illustrative construction of a first encoding circuit of a noise component encoding circuit of the encoder embodying the present invention.

FIG. 12 shows an illustrative configuration of the first encoding unit 124 of FIG. 10 for encoding the noise components of the respective channels without common handling.

Referring to FIG. 12, the noise components for the channel $ch_1$ via the terminal $121_1$ of FIG. 10 are supplied to a terminal $140_1$, while the noise components for the channel $ch_2$ via the terminal $121_2$ of FIG. 10 are supplied to a terminal $140_2$. These noise components are sent to associated normalization circuits $141_1$, $141_2$.

The normalization circuits $141_1$, $141_2$ normalize the noise components of the channels $ch_1$ and $ch_2$, respectively, and send the normalized noise components to quantizers $145_1$, $145_2$, while sending the normalized scale factors to quantizers $143_1$, $143_2$.

The scale factors quantized by the quantizers $143_1$, $143_2$ are outputted at associated terminals $147_1$, $147_2$. The quantizers $145_1$, $145_2$ quantize the channel-based noise components with the numbers of bits as determined by the adaptive quantization step information from associated quantization step decision circuits $142_1$, $142_2$, respectively. The noise components quantized by these quantizers $145_1$, $145_2$ are outputted via associated terminals $148_1$, $148_2$, respectively.

Figure 4:
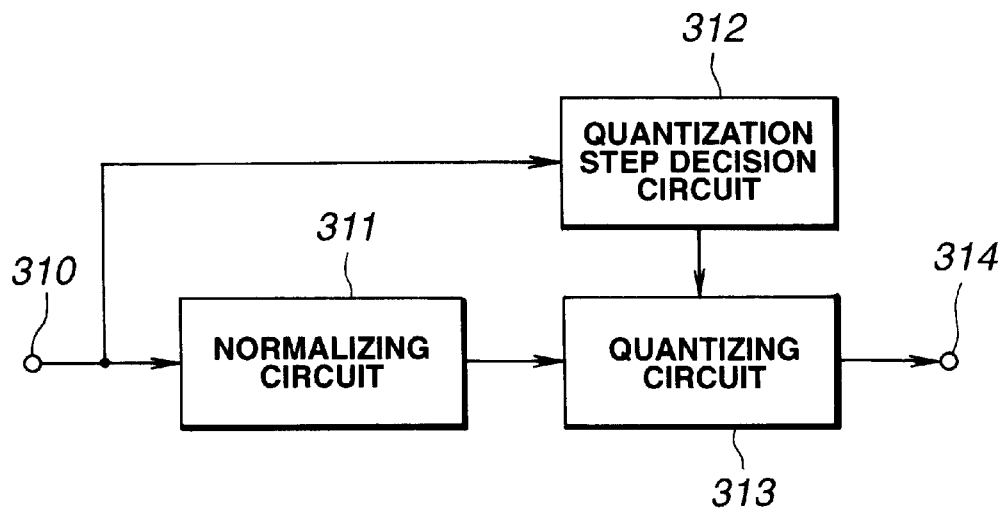
FIG. 4 is a block circuit diagram showing a basic construction of a signal component encoding circuit.

The construction and operation of the normalization circuit $141_1$, quantizer $145_1$, quantization step decision circuit $142_1$, normalization circuit $141_2$, quantizer $145_2$ and the quantization step decision circuit $142_2$ are the same as those shown in FIG. 4.

The quantization step information data of the quantization step decision circuits $142_1$, $142_2$ are also quantized by the quantizers $146_1$, $146_2$, respectively, so as to be outputted at associated terminals $149_1$, $149_2$ respectively.

The encoded noise components, scale factors and quantization step information data from the terminals 147 to 149 are sent to one of the fixed terminals of the changeover switch 126 of FIG. 10.

Figure 13:
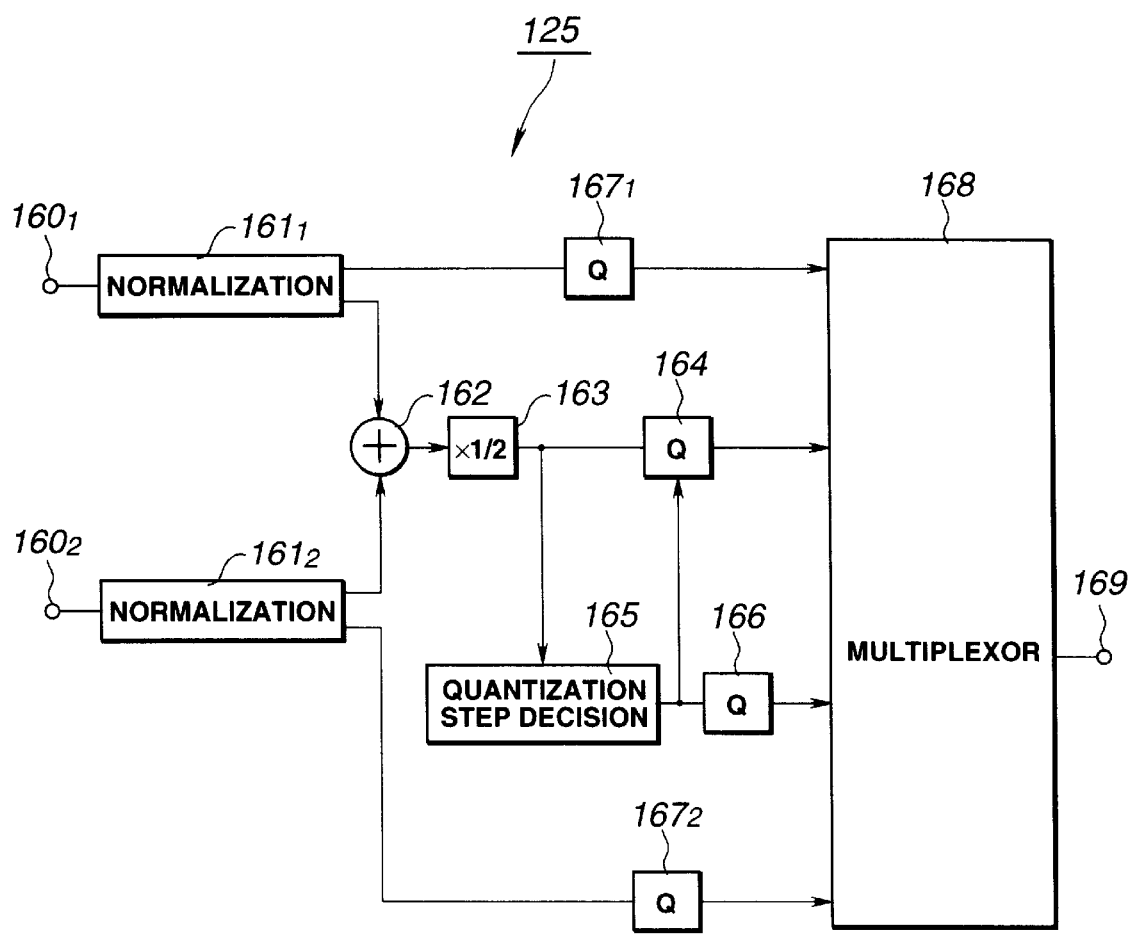
FIG. 13 is a block circuit diagram showing an illustrative construction of a second encoding circuit of a noise component encoding circuit of the encoder embodying the present invention.

FIG. 13 shows an illustrative configuration of the second encoding unit 125 of FIG. 10 for encoding the noise components in common.

Referring to FIG. 13, noise components for the channel $ch_1$ via the terminal $121_1$ of FIG. 10 are sent to a terminal $160_1$, while noise components for the channel $ch_2$ via the terminal $121_2$ of FIG. 10 are sent to a terminal $160_2$. These noise components are sent to associated normalization circuits $161_1$, $161_2$.

The normalization circuits $161_1$, $161_2$ normalize the noise components for the channels $ch_1$ and $ch_2$ as described above and transmit the resulting scale factors to quantizers $167_1$, $167_2$. The scale factors quantized by these quantizers $167_1$, $167_2$ are sent to a multiplexor 168. The noise components normalized by the normalization circuits $161_1$, $161_2$ are sent to an adder 162.

The adder 162 sums the normalized noise components of the respective channels. An output of the adder 162 is sent to a quantizer 164 via a multiplier 163 configured for multiplying a coefficient ½. The quantizer 164 quantizes the supplied noise components with the number of allocated bits from a quantization step decision circuit 165 which decides the quantization step based upon an output of the multiplier 163. An output of the quantizer 164 is sent to a multiplexor 168, while the quantization step information from the quantization step decision circuit 165 is quantized by a quantizer 166 and subsequently sent to the multiplexor 168.

The multiplexor 168 multiplexes the noise components handled in common and quantized by the quantizer 164 as described above, quantized quantization step information and the quantized channel-based scale factors and outputs the resulting data at an output terminal 169. An output of the terminal 169 is sent to the other fixed terminal of the changeover switch 126 of FIG. 10.

Figure 14:
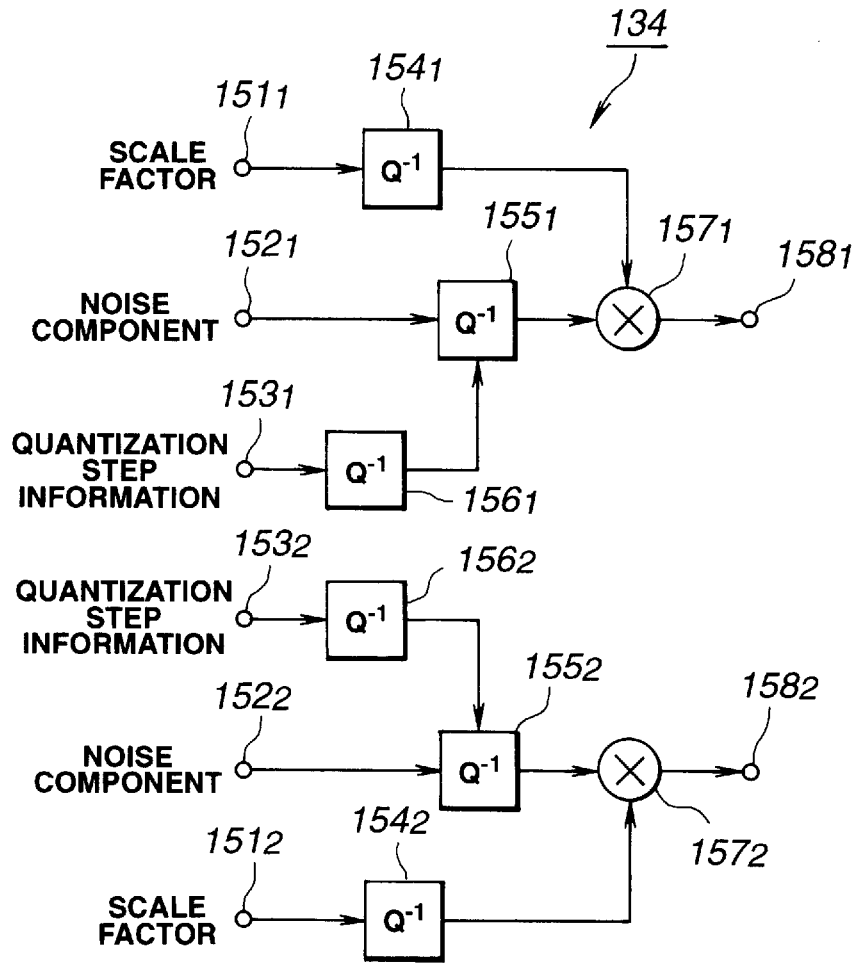
FIG. 14 is a block circuit diagram showing an illustrative construction of a first decoding circuit of a noise component decoding circuit of the encoder embodying the present invention.

An illustrative configuration of the first decoding unit 134 of FIG. 11, decoding the channel-based noise components, encoded without being handled in common, is explained by referring to FIG. 14. The configuration of FIG. 14 corresponds to the first encoding unit 124 shown in FIG. 12.

Referring to FIG. 14, terminals $151_1$, $152_1$ and $153_1$ are associated with a channel $ch_1$, while terminals $151_2$, $152_2$ and $152_3$ are associated with a channel $ch_2$. The quantized scale factors corresponding to signals at terminals $147_1$, $147_2$ of FIG. 12, the normalized and quantized noise components corresponding to signals at the terminals $148_1$, $148_2$ of FIG. 12 and the quantized quantization step information corresponding to signals at the terminals $149_1$, $149_2$ of FIG. 12, are supplied to the terminals $151_1$, $151_2$, terminals $152_1$, $152_2$ and to the terminals $153_1$, $153_2$, respectively. The signals supplied to the terminals $151_1$, $151_2$ to $153_1$, $153_2$ are sent to associated dequantizers $154_1$, $154_2$ to $156_1$, $156_2$ for dequantization.

That is, the dequantizers $155_1$, $155_2$, supplied with normalized and quantized noise components, dequantize these components based upon the quantization step information from the dequantizers $156_1$, $156_2$ dequantizing the quantized quantization step information.

The noise components from the dequantizers $155_1$, $155_2$ are sent to multipliers $157_1$, $157_2$, respectively. These multipliers $157_1$, $157_2$ are also fed with scale factors from the dequantizers $154_1$, $154_2$, dequantizing the quantized scale factors, respectively.

Thus the multipliers $157_1$, $157_2$ multiply the noise components with the scale factors for effecting denormalization.

The denormalized channel-based noise components are sent via associated terminals $158_1$, $158_2$ to the changeover switch 136 of FIG. 11.

Figure 15:
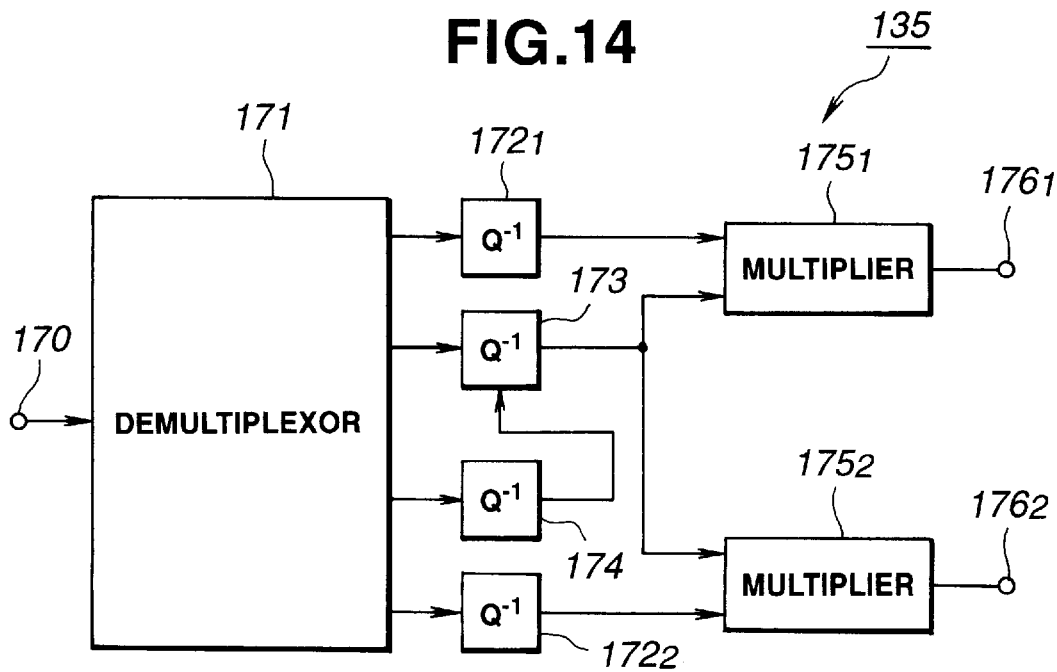
FIG. 15 is a block circuit diagram showing an illustrative construction of a second decoding circuit of a noise component decoding circuit of the encoder embodying the present invention.

An illustrative configuration of the second encoding unit 135 of FIG. 11, decoding the noise components encoded in common is explained by referring to FIG. 15. The configuration of FIG. 15 corresponds to the second decoding unit 125 shown in FIG. 13.

Referring to FIG. 15, common-encoded noise components, corresponding to signals at the terminal 169 of FIG. 13, are fed to a terminal 170. The encoded signals, thus fed to the terminal 170, are demultiplexed by a demultiplexor 171 into quantized channel-based scale factors, quantized quantization step information and he noise components handled in common and quantized.

The channel-based quantized scale factors are sent to associated dequantizers $172_1$, $172_2$ for dequantization. The channel-based scale factors, thus dequantized by the dequantizers $172_1$, $172_2$, are sent to associated multipliers $175_1$, $175_2$, respectively.

The noise components, handled in common and quantized, are sent to a dequantizer 173, while the quantized quantization step information is sent to a dequantizer 174. The dequantizer 173 dequantizes the noise components, handled in common and quantized, based upon the quantization step information dequantized by the dequantizer 174. The noise components, handled in common and dequantized by the dequantizer 173, are sent to the multipliers $175_1$, $175_2$.

The multipliers $175_1$, $175_2$ multiply the noise components with scale factors for the channels $ch_1$, $ch_2$ for denormalization.

The denormalized channel-based noise components are sent via associated terminals $176_1$, $176_2$ to the changeover switch 136 of FIG. 11.

Figure 16:
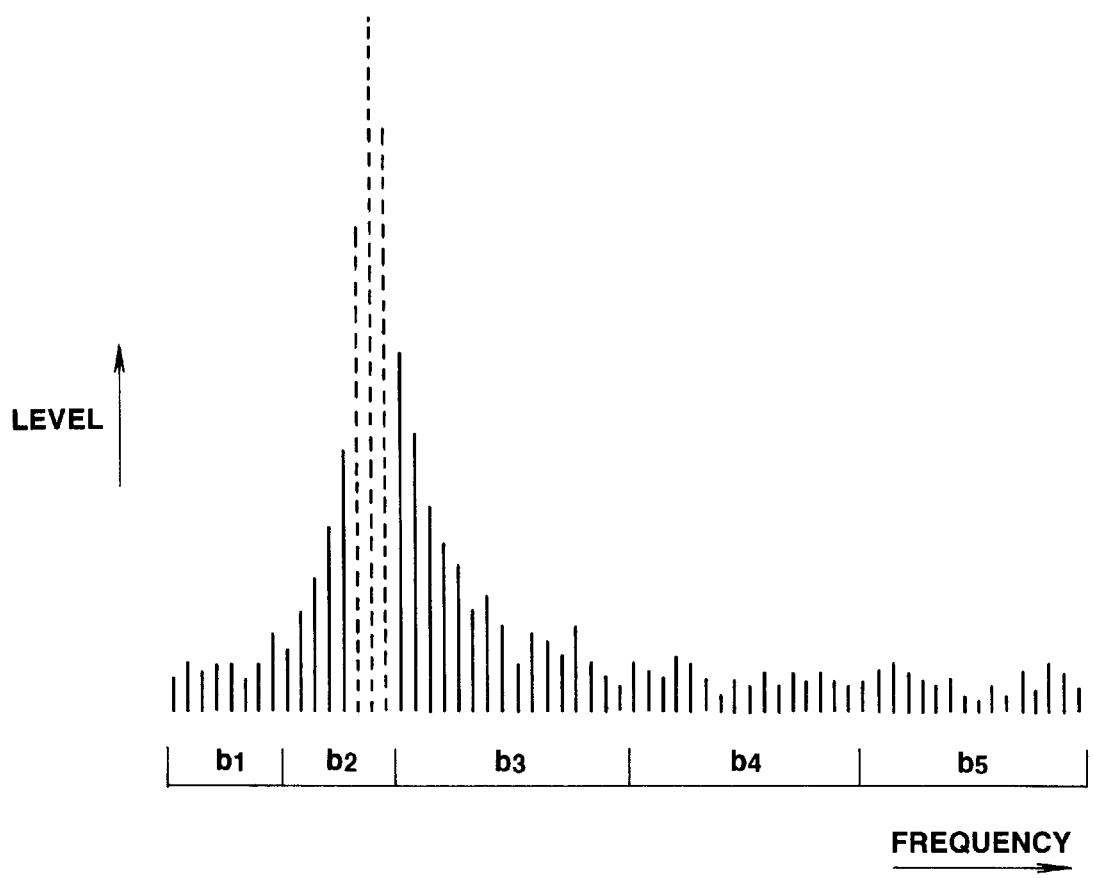
FIG. 16 is a graph showing an original spectral signal in the signal encoding of the present embodiment.

Referring to FIG. 16 ff., separation of the nose and tonal components from each other in the signal component separating circuits $102_1$, $102_2$ of FIG. 8 is explained.

Figure 17:
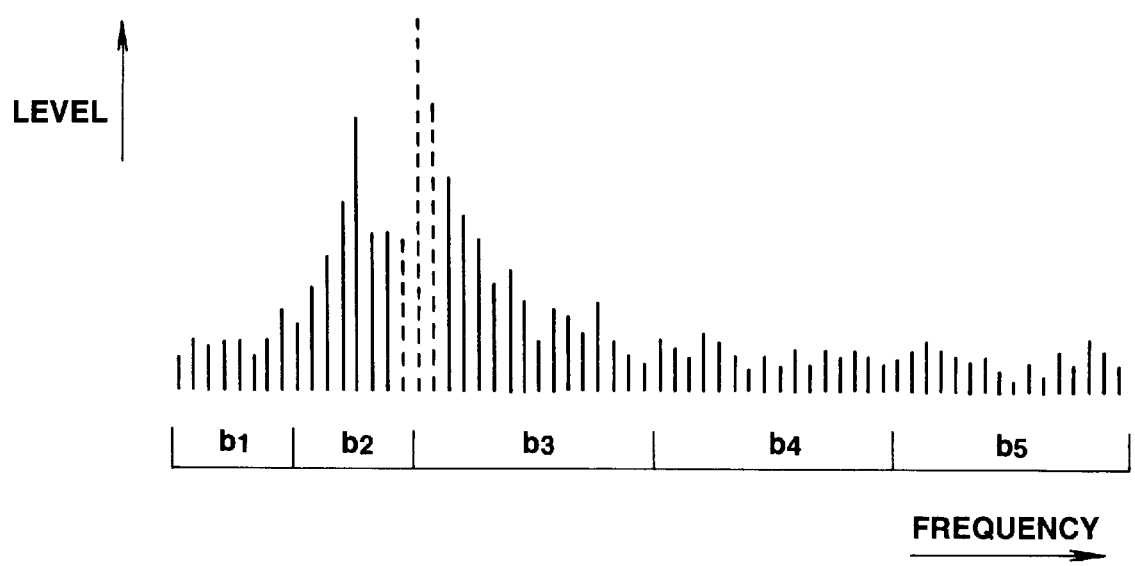
FIG. 17 is a graph showing noise components which are the original spectral signal in the signal encoding of the present embodiment less tonal components.

FIG. 16 shows typical spectral signals (frequency components) supplied from the converting circuits $101_1$, $101_2$. FIG. 17 shows noise components corresponding to the spectral signals of FIG. 16 from which a tonal component shown by broken lines in FIG. 16, has been separated. In FIG. 16, the ordinate shows the levels (dB) of absolute values of the spectral signals (frequency components) obtained by MDCT, and the input audio signal is transformed into e.g., 64 spectral signals from frame to frame.

Since the tonal components are usually concentrated in a smaller number of spectral signals, as in the example of FIG. 16, the number of quantization bits is not increased excessively if these spectral components are quantized with fine quantization steps. The encoding efficiency can be improved by normalizing and subsequently quantizing these tonal components. However, since the spectral signals constituting the tonal components are relatively few, as previously explained, the normalization or re-quantization process, for example, may be omitted for simplifying the apparatus.

Referring to FIG. 17, not all tonal components shown by broken lines in FIG. 16 are not omitted, but the portions of the tonal components lower than a pre-set level are left as noise components. In addition, the components shown by broken lines in FIG. 17 may be extracted as tonal components from the noise components of FIG. 17. The encoding with higher accuracy may be realized by repeating these operations. If this process is utilized, finer quantization steps may be achieved even although the upper limit of the number of bits for contusing the tonal components is set to a lower value, thus allowing it to decrease the number of bits of the quantization step information indicating the number of quantization bits. The above-described process of extracting tonal components in plural stages is not necessarily limited to the case of subtracting signals equivalent to encoded and subsequently decoded tonal components from the original spectral signals but may be applied to the case of setting the spectral components of the extracted tonal components to zero, The description "signals freed of tonal components" is meant to comprise these two cases.

Figure 18:
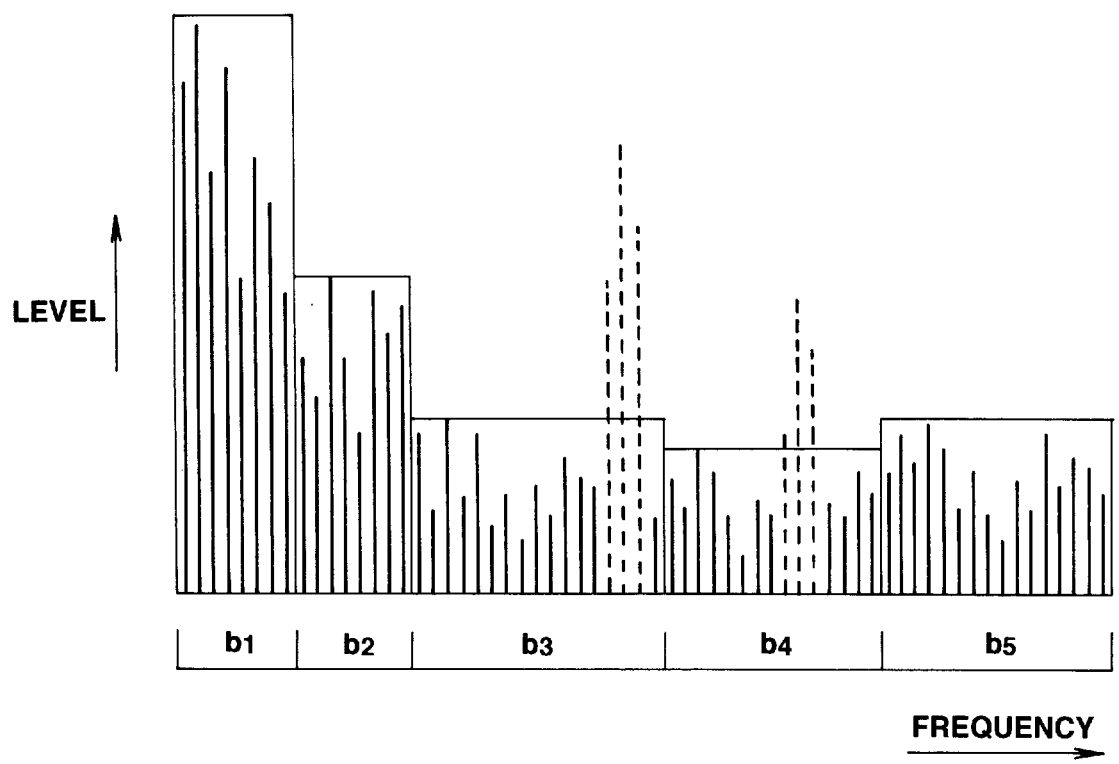
FIG. 18 is a graph showing spectral signals having tonal components towards the high range side in the signal encoding of the present embodiment less tonal components.

FIG. 18 shows typical spectral signals in case the tonal components are extracted only on the high frequency range.

The spectral signals shown in FIG. 18 are similarly separated into tonal components shown by broken lines and the remaining noise components.

Referring to FIG. 18, it should be noted that, if sufficient frequency resolution is to be maintained in the low frequency range after orthogonal transform, it is necessary to use an extremely long block length for orthogonal transform, which is extremely difficult to achieve with a small-scale unit. On the other hand, for encoding tonal components, it is necessary to encode the normalization information or position information data for these tonal components. However, if there exist numerous tonal components difficult to separate in the low frequency range, it is not meritorious for improving the encoding efficiency to record these information data in a number corresponding to the number of the extracted tonal components. Thus, if sufficient frequency resolution cannot be achieved in the low frequency range, it is desirable to separate tonal components only in the high frequency range and to encode them as in the example of FIG. 18.

It is also possible in FIG. 18 to leave the portions of the tonal components shown by broken lines in FIG. 18 lower than a pre-set level as noise components as shown in FIG. 17, instead of removing the tonal components in their entirety, and to separate the tonal components further from these noise components.

Figure 19:
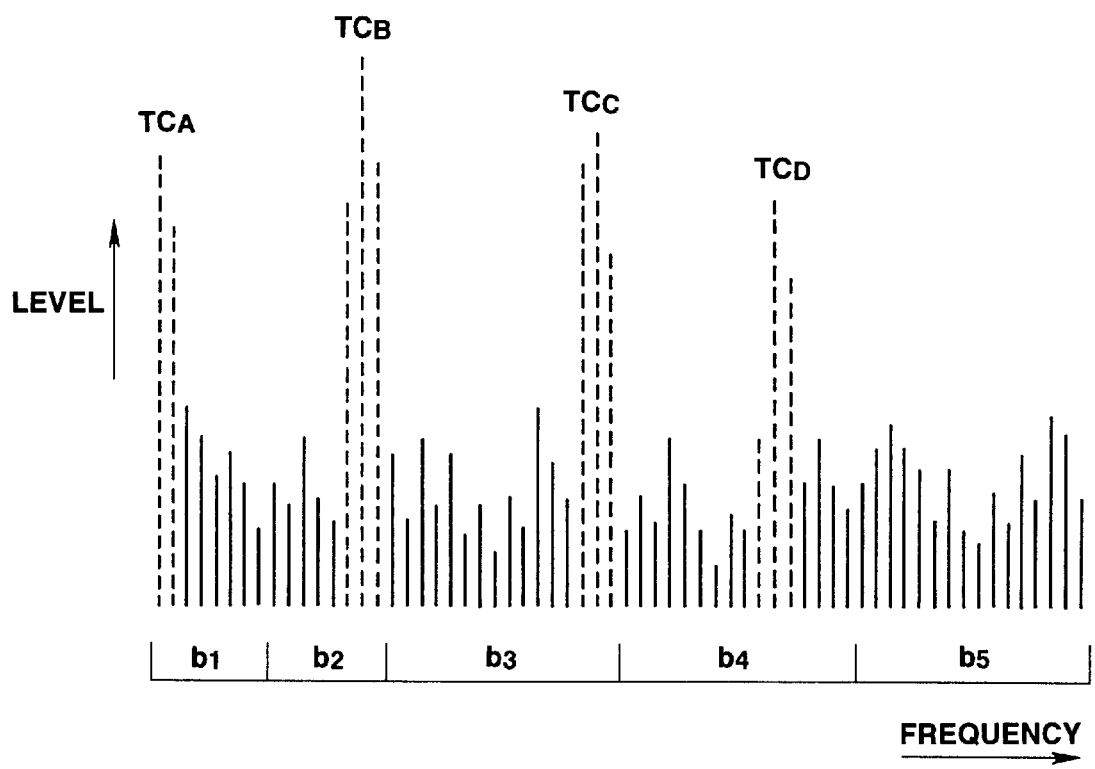
FIG. 19 is a graph showing spectral signals containing four tonal components.
Figure 20:
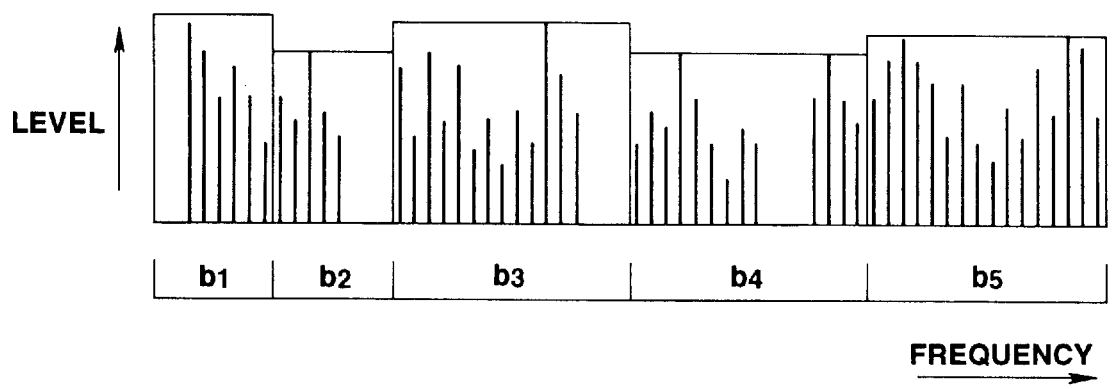
FIG. 20 is a graph showing noise components which are spectral signals containing four tonal components less tonal components.
Figure 21:
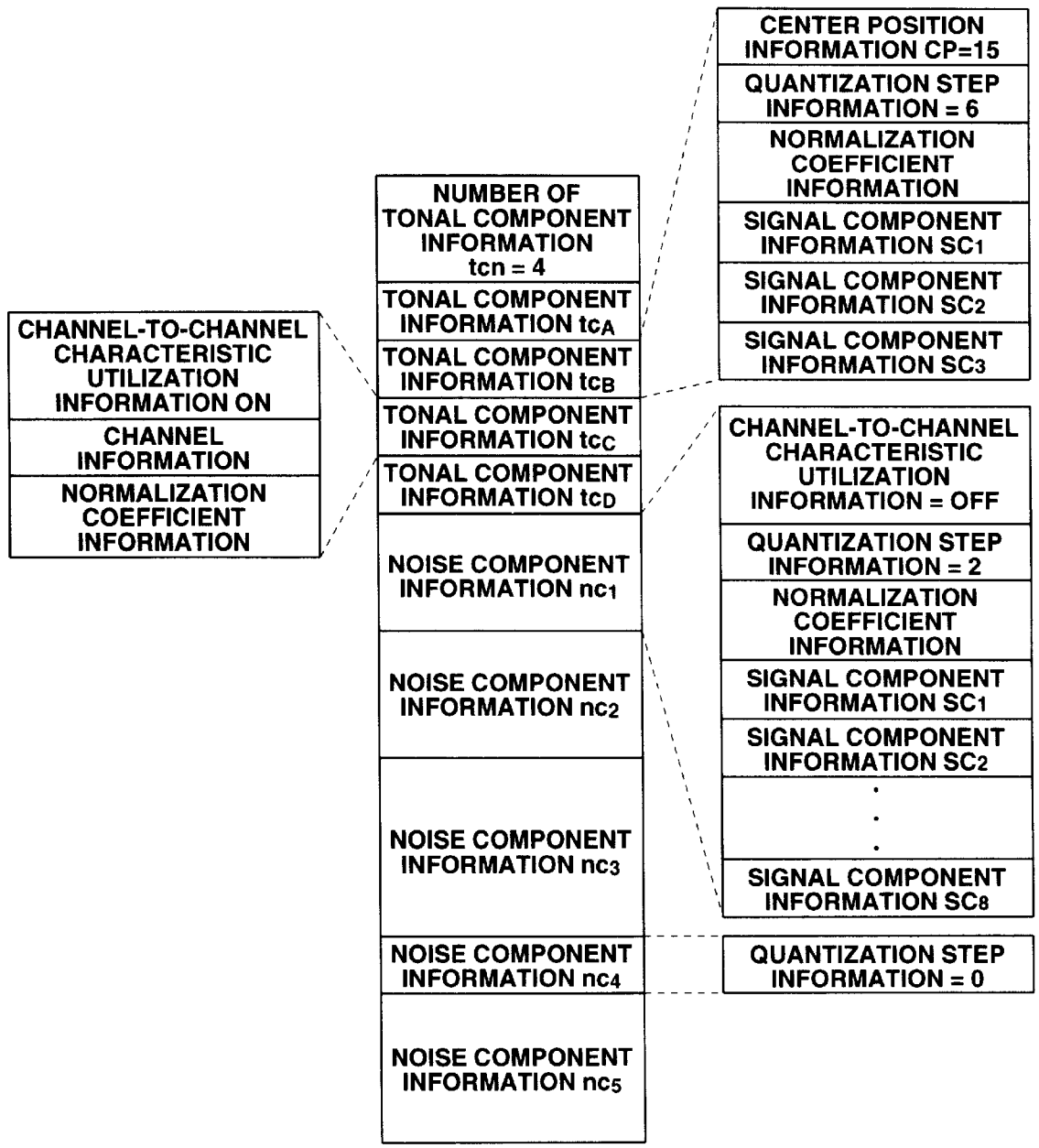
FIG. 21 is a diagrammatic view showing an example of a code string obtained on signal encoding according to the present invention.

Referring to FIGS. 19 to 21, separation of the tonal and noise components from the spectral signals as well as the code string separated by the code string generating circuit 106 is explained.

FIG. 19 shows typical spectral signals in which there exist four tonal components $TC_A$, $TC_B$, $TC_C$ and $TC_D$. FIG. 20 shows noise components obtained by subtracting the tonal components $TC_A$, $TC_B$, $TC_C$ and $TC_D$ from the spectral signals shown in FIG. 19. Since the tonal components $TC_A$, $TC_B$, $TC_C$ and $TC_D$ are subtracted from the original spectral signals in the bands b1 to b5, as shown in FIG. 20, the normalization coefficients in the encoding unit assume a small value thus enabling the quantization noise to be diminished even although a smaller number of quantization bits is employed.

In the examples of FIGS. 19 and 20, the portions of the tonal components $TC_A$, $TC_B$, $TC_C$ and $TC_D$ lower than a pre-set level may be left as noise components without completely eliminating these tonal components $TC_A$, $TC_B$, $TC_C$ and $TC_D$ of FIG. 19 and the tonal components may further be removed from the noise components.

The noise components may be encoded more efficiently by exploiting characteristics of the human hearing sense. That is, since the masking effect operates on the frequency axis in the vicinity of the tonal components, there is not any significant difference between the original sound and decoded acoustic signals if encoding is performed on the assumption that the noise components in the vicinity of the extracted tonal components is equal to zero.

FIG. 21 shows an illustrative example of a code string obtained by separating the spectral signals into tonal and noise components and encoding these components, that is the code string recorded on a recording medium.

Referring to FIG. 21, the number of tonal component information data tcn, which is four in the example of FIG. 19, followed by tonal component information data $tc_A$, $tc_B$, $tc_C$ and $tc_D$, associated with the tonal components $TC_A$, $TC_B$, $TC_C$ and $TC_D$ of FIG. 19 and by noise component information data $nc_1$, $nc_2$, $nc_3$, $nc_4$ and $nc_5$ for the bands b1 to b5 of FIG. 19, are arrayed in this sequence as the code string.

The tonal component information includes a center position information data CP specifying the center component of the tonal components, which is 15 in the case of the tonal component $TC_B$, the quantization step information data specifying the number of quantization bits, which is e.g. 6 for the tonal component $TC_B$, and by the normalization coefficient information data. These information data are arrayed in the code string along with the normalized and quantized signal component information data, such as information data $SC_1$, $SC_2$ and $SC_3$. If the quantization step is fixed depending upon the frequency, there is naturally no necessity of arraying the quantization step information.

Although the position of the center component of the tonal components is used in the above embodiment as the position information for the tonal components, it is possible to record the number of the lower most spectral component, which is 14 in the case of the tonal component $TC_B$.

If the noise components are not handled in common, the noise component information, such as the noise component information $nc_1$, includes the channel-to-channel characteristics utilization information, which is off if common handling is not performed, the quantization step information, normalization coefficient information (scale factors) and the information on normalized and quantized signal component information data, such as information data $SC_1$, $SC_2$, ..., $SC_8$.

On the other hand, if the noise components are handled in common, the noise component information, such as the noise component information $nc_2$, includes the channel-to-channel characteristics utilization information, which is on, the information on signal components of channels handled in common and the normalization coefficient information data (scale factors).

In FIG. 21, the quantization step information being zero, such as the noise component information $nc_4$ of FIG. 21 associated with the band b4 of FIGS. 9 and 10, indicates that encoding is actually not carried out for the encoding unit. As for these noise component information data, there is no necessity of recording the quantization step information if the quantization step is pre-set depending upon the frequency. However, in such case, it becomes impossible to designate the encoding unit in which the encoding actually is not carried out, such as the band b4. In such case, it suffices to add a one-bit flag for specifying whether or not encoding is actually carried out in each encoding unit.

Figure 22:
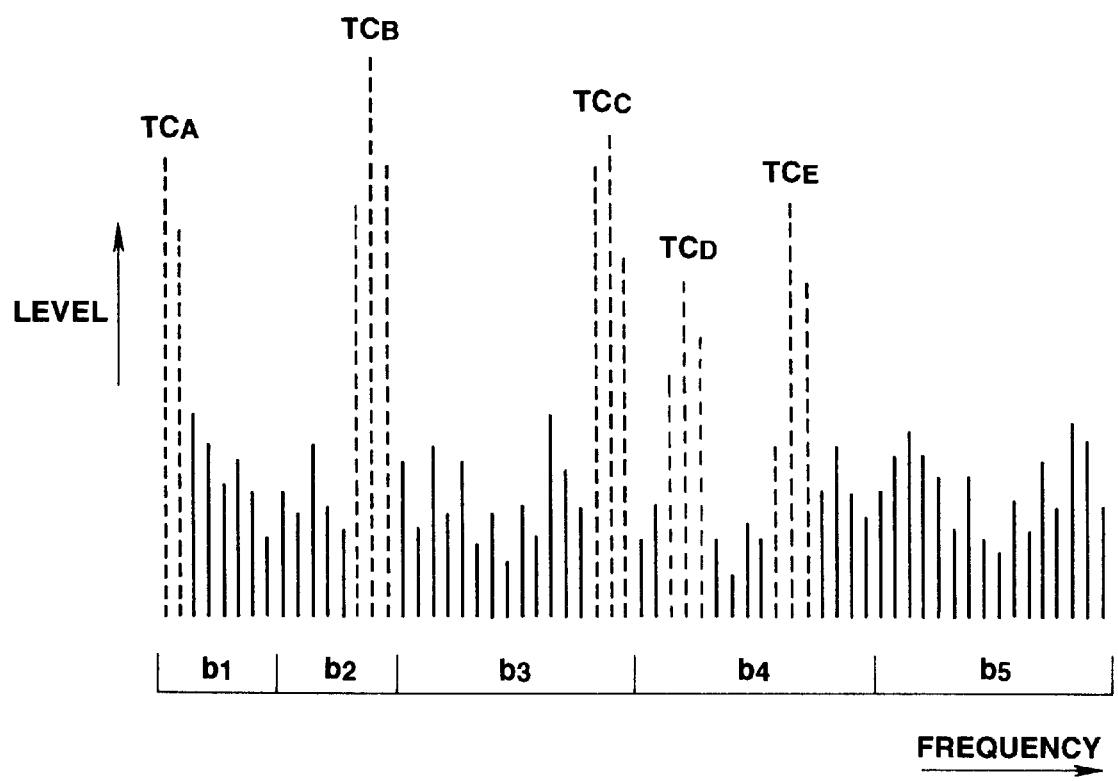
FIG. 22 is a graph showing decision of noise components to be handled in common with the aid of the sum of widths of noise components.
Figure 23:
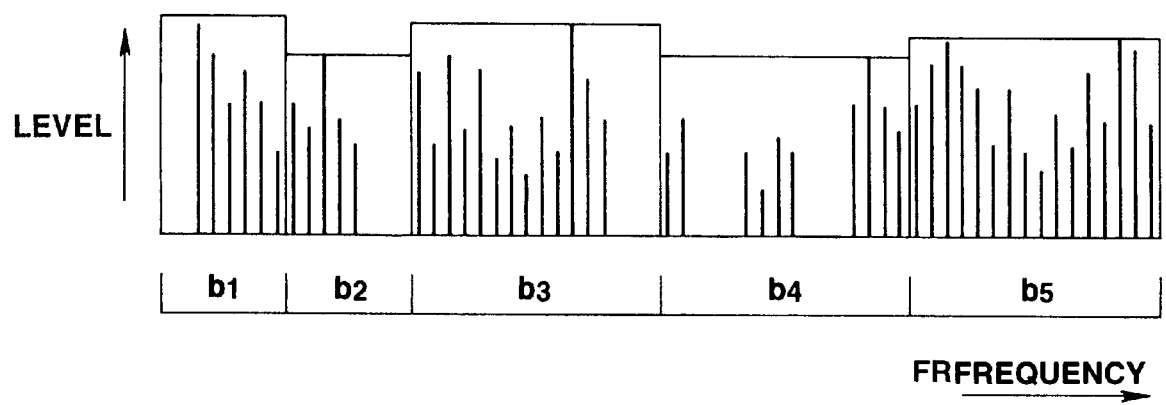
FIG. 23 is a graph showing noise components which are spectral signals of FIG. 22 less tonal components.

FIGS. 22 and 23 illustrate typical spectral signals and noise signals in cases wherein discrimination by the discrimination circuit 123 of FIG. 10 is done based upon the information on the sum of widths of noise components left after extraction of tonal components and the information of the bandwidths of the encoding units.

Referring to FIGS. 22 and 23, the noise components in the band b4, among bands b1 to b5 for a given channel, in which there exist many tonal components, that is in which the sum of widths of noise components is small relative to the bandwidth of the band, can be handled in common since ill effects caused by handling in common with noise components in other channels are only little.

In the examples of FIG. 23, the portions of the tonal components $TC_A$ to $TC_E$ of FIG. 22 lower than a pre-set level may be left as noise components without completely eliminating these tonal components. In addition, the tonal components may further be removed from the noise components.

Figure 24:
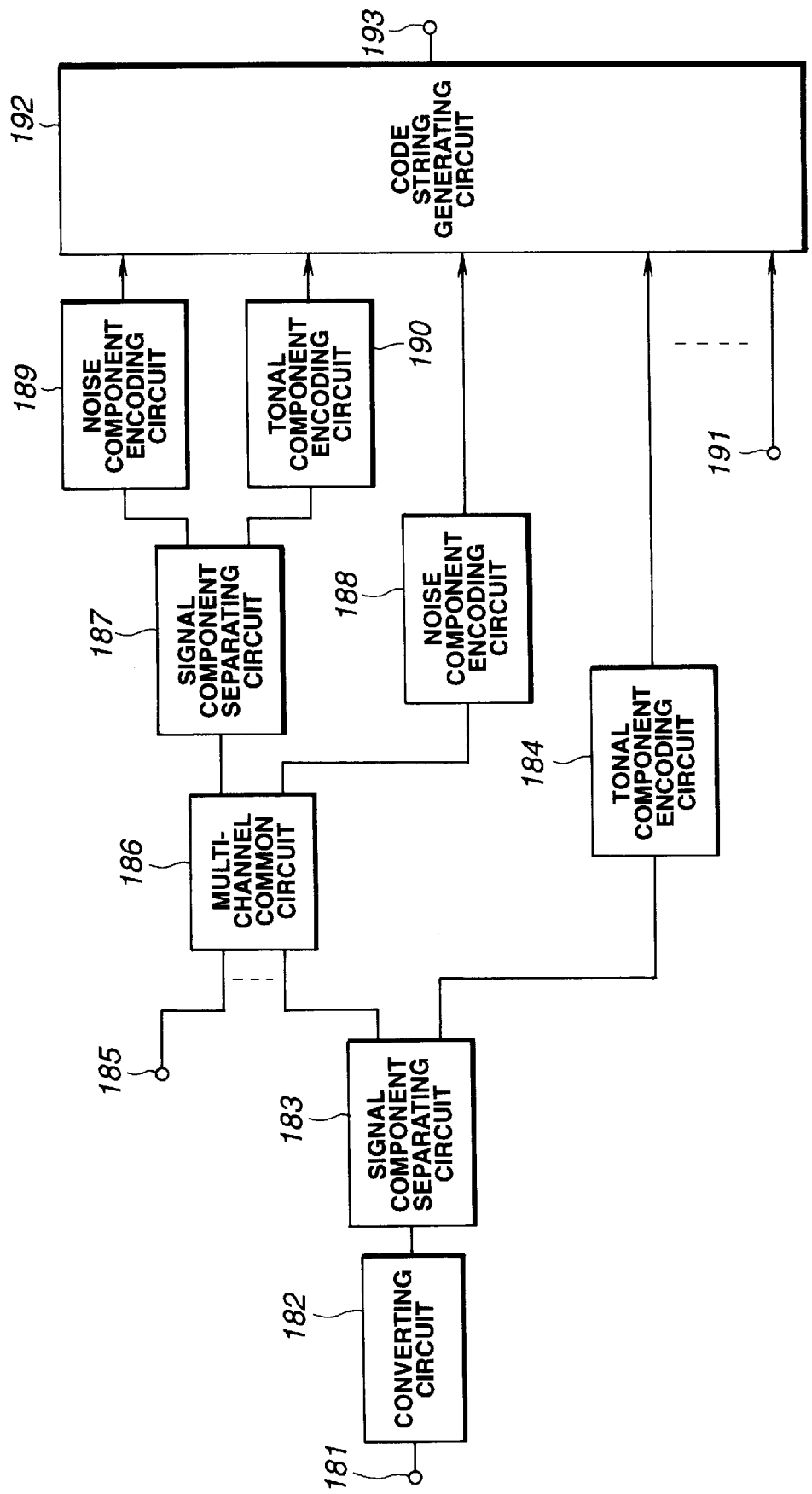
FIG. 24 is a schematic block diagram showing a configuration of a signal encoder for encoding tonal components and noise components separated from noise components handled in common.

FIG. 24 shows a configuration of an apparatus in which, when the noise components are handled in common and the noise components thus handled in common are further separated into tonal components and other noise components for encoding. Although FIG. 24 shows main components for only one channel, a code string generating circuit 192 generates the code string for all channels lumped together.

In FIG. 24, components from an input terminal 124 up to a signal component separating circuit 183 are similar to the components from the input terminal 600 up to the signal component separating circuit 602.

The tonal components separated by the signal component separating circuit 183 are encoded by a tonal component encoding circuit 184 as described above and thence supplied to the code string generating circuit 192 similar to the circuit described above. The code string separating circuit 192 is fed via a terminal 191 with the encoded information data of the tonal components from the tonal component encoding circuits 184 of other channels.

On the other hand, the noise components separated by the signal component separating circuit 183 are sent to a circuit for handling plural channels in common 186. The circuit for handling plural channels in common 186 is also fed via a terminal 185 with noise components from the signal component separating circuits 183 from other channels. The circuit for handling plural channels in common 186 discriminates in a manner similar to the discrimination circuit 123 whether or not the noise components of respective channels should be handled in common. If the plural channels are to be handled in common, the circuit 186 sums the normalized noise components of the respective channels and multiplies the resulting sum by ½ if there exist two channels by way of effecting common handling processing. The resulting data is fed to a signal component separating circuit 187. If the plural channels are not to be handled in common, the circuit 186 sends the normalized noise components of the respective two channels to a noise component encoding circuit 188. The noise component encoding circuit 188 encodes the noise components of the respective channels which are not handled in common and sends the encoded noise components to the code string generating circuit 192.

The noise components, processed for common handling by the circuit for handling plural channels in common 186, are separated by the signal component separating circuit 187 further into tonal and noise components. If the noise components of plural channels are processed for common handling, there are occasions wherein spectral components are concentrated in a few particular frequency components to generate tonal components depending on the manner of formulating common-handled data. Thus the signal component separating circuit 187 separates the common-handled noise components into tonal and noise components. If component concentration in a few particular frequency components occurs due to the common-handled noise components, and if these spectral components are not quantized with sufficiently fine quantization steps, block-to-block distortion becomes significant when the spectral components are restored to time-domain waveform signals and synthesized with temporally forward and backward blocks, thus proving a significant obstruction to the hearing sense.

The tonal components separated by the signal component separating circuit 187 are sent to a tonal component encoding circuit 190, while the noise components are sent to a noise component encoding circuit 189. The frequency components encoded by the tonal component encoding circuit 190 and noise component encoding circuit 189 are sent to the code string generating circuit 192.

If the common handling processing is not performed, the code string generating circuit 192 outputs the channel-based encoded tonal components and the channel-based encoded noise at an output terminal 193. If the common handling processing is performed, the code string generating circuit 192 generates a pre-set code string from the channel-based encoded signal, an encoded signal of the tonal and noise components separated from the noise components processed for common handling and the channel-based encoded tonal components, and outputs the generated code string at the output terminal 193.

Figure 25:
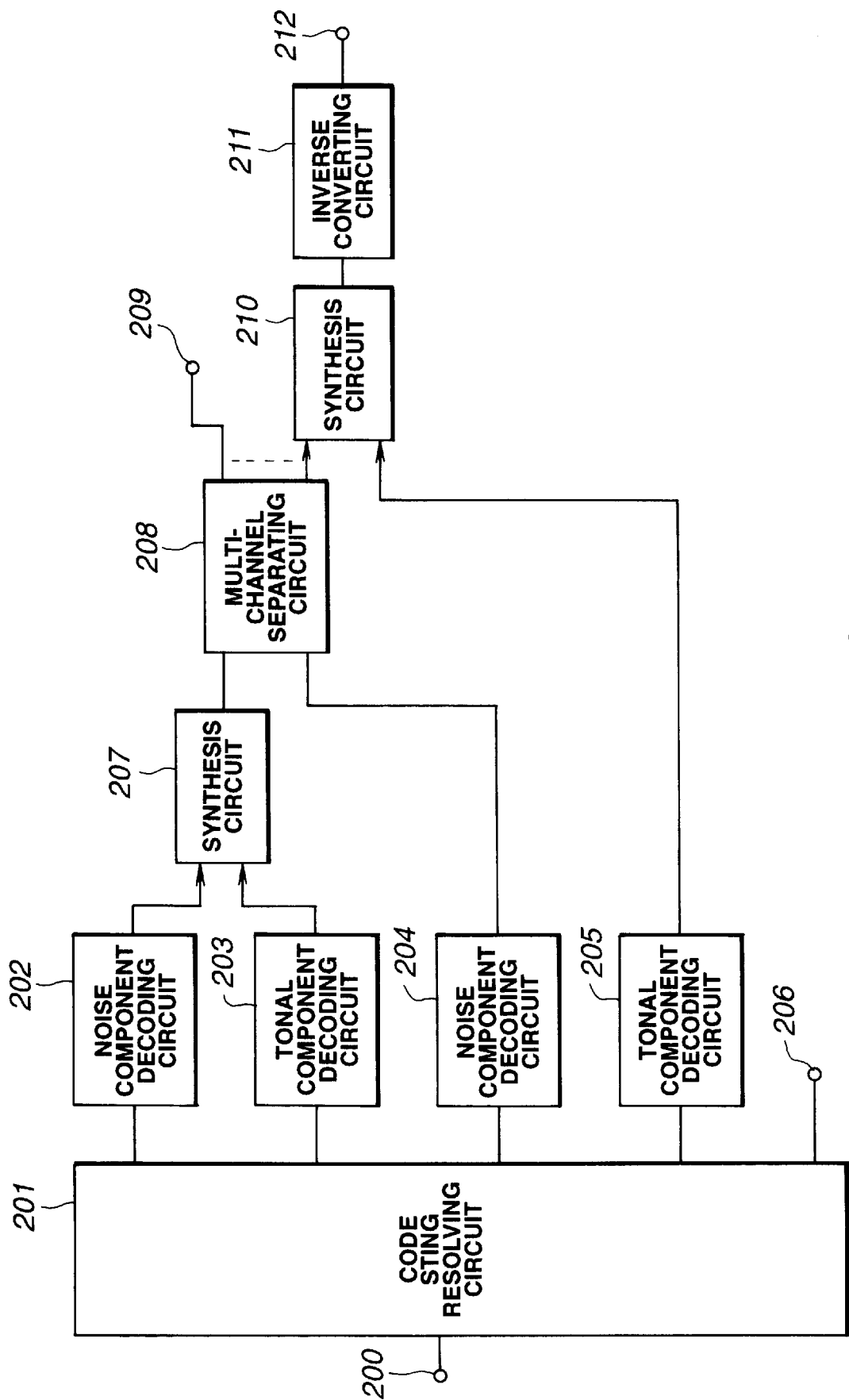
FIG. 25 is a schematic block circuit diagram showing a signal decoder for decoding signals obtained by encoding the tonal components and noise components separated from the noise components handled in common.

FIG. 25 shows a configuration of a signal decoder which is a counterpart of the signal encoder of FIG. 24.

Referring to FIG. 25, a code string formed by the signal encoder of FIG. 24, recorded on a recording medium and subsequently reproduced, or a code string transmitted by a transmission medium, is supplied to a terminal 200.

The code string is separated by a code string resolving circuit 201 into a signal encoded from tonal components of the original spectral signals of the respective channels and a signal encoded from the noise components. If the noise components are not processed for common handling at the time of encoding, the code string resolving circuit separates the signal encoded from the channel-based original spectral signal. If the noise components are processed for common handling at the time of encoding, the code string resolving circuit separates the encoded signals encoded from the tonal and noise components generated by common handling processing of noise components of the channel-based original spectral signals.

The tonal components encoded from the original spectral signals, separated by the code string resolving circuit 201, are sent to and decoder by a tonal component decoding circuit 205. The encoded tonal components of other channels are sent via a terminal 206 to the tonal component decoding circuit 205 for each channel for decoding.

The noise components encoded without being handled in common, separated by the code string resolving circuit 201, are sent to and decoded by the noise component decoding circuit 204. The resulting signals, decoded from the noise components encoded without being handled in common, are separated into respective channels by a channel separating circuit 208. The signal of the relevant channel are sent to a synthesis circuit 210, while the signals of other channels are sent via a terminal 209 to a synthesis circuit associated with the respective channels.

On the other hand, the encoded signals of the noise components and tonal components resulting from the noise components handled in common, separated by the code string separating circuit 201, are sent to an associated noise component decoding circuit 202 and an associated tonal component decoding circuit 203 for decoding and subsequent synthesis by a synthesis circuit 207. An output of the synthesis circuit 207 is sent to a channel separating circuit 208 for separation into channel-based noise components. The noise components of the other channels are outputted at a terminal 209 and the noise components of the relevant channel are sent to the synthesis circuit 210.

The synthesis circuit 210 synthesizes the noise components from the tonal component decoding circuit 205 and those from the channel separating circuit 208 and sends the synthesized signals to an inverse transform circuit 211. The inverse transform circuit 211 is similar to that described above and issues an inverse transformed signal which is outputted at a terminal 212.

With the above-described embodiments of the present invention, the noise components of plural channels can be encoded in common for improving the encoding efficiency and lowering the transmission rate. If spectral signals are concentrated in a few particular frequency components to produce tonal signals by common encoding of the tonal components, the tonal signals can be further separated into noise and tonal components for encoding for reducing quantization distortion of tonal components present in the common-handled tonal components, thereby realizing optimum encoding and high encoding efficiency. If component concentration occurs in particular frequency components due to common-handled noise components, and if, in such case, these spectral components are not quantized with a sufficient number of quantization steps, block-to-block distortion becomes significant when the spectral signals are restored into time-domain waveform signals, thus presenting serious obstructions to the hearing sense. This may be eliminated with the embodiments of the present invention. It does not matter if the encoding method for data not handled in common is such a method in which tonal components are not separated for encoding. Further the selection of proper channels for common handling becomes possible by employing the amount of separation of the tonal components in each channel as an index for discrimination in the discrimination circuit.

The present Assignee has proposed a technique of separately encoding tonal and noise components in International Application No. PCT/JP94/01056 (International Publication No. WO95/01680), date of International Publication Jan. 12, 1995; European Patent Application Publication No. 0645769 A2 (date of publication of application Mar. 29, 1995, Bulletin 95/13), International Application No. PCT/JP94/01863, International Application No. PCT/JP95/0635, in addition to the above-referenced PCT/JP94/00880. The techniques disclosed therein may be applied to the present embodiment.

Industrial Applicability

With the signal encoding method and apparatus and the signal transmission method of the present invention, since second signals of plural channels are processed in common based upon the results of detection of characteristics of the second signals of plural channels, the compression ratio for the second signals of the plural channels may be increased by encoding the common-handled second signals. By making selective switching between the common encoding in which the second signals of plural channels are handled in common and encoded and the individual encoding in which the second signals of plural channels are encoded individually, the compression ratio may be improved in case of common handling, while ill effects due to such common handling may be avoided if such common handing is not made.

With the signal decoding method and apparatus of the present invention, by decoding channel-based encoded first signals and decoding second signals handled in common based upon the results of detection of characteristics for encoding, decoded signals can be regenerated from the signals encoded by the signal encoding method and apparatus of the present invention.

That is, in accordance with the present invention, the encoded data volume may be prohibited from being increased even when handling plural channels. In addition, decoded signals may be prohibited from being deteriorated even although the encoded data volume is prohibited from being increased.

Further, with the recording medium of the present invention, on which are recorded signals encoded by the signal encoding method and apparatus of the present invention, the recording capacity of the recording medium may be exploited effectively.

We claim:

1. A signal encoding method for encoding input signals of plural channels, comprising the steps of:
   transforming the input signals into frequency components;
   separating said frequency components into first signals made up of first tonal components having a magnitude of at least a first pre-set level and second signals made up of second tonal components and non-tonal components, the components of the second signals having a magnitude less than the first pre-set level;
   encoding the first and second signals;
   detecting a number of tonal components of said second signals of plural channels; and
   encoding said second signals of plural channels by handling them in common based upon the results of detection.

2. The signal encoding method as claimed in claim 1, wherein selective switching is made, based upon the results of detection, between individual encoding for encoding the second signal of plural channels and common encoding for encoding the second signals of plural channels.

3. The signal encoding method as claimed in claim 2, wherein selective switching between said individual encoding and said common encoding based upon the results of detection is carried out from one encoding unit to another.

4. The signal encoding method as claimed in claim 3, wherein the encoding unit divides the total number of bits available for bit allocation between a fixed bit allocation pattern pre-set for each small block and a block-based signal magnitude dependent bit allocation.

5. The signal encoding method as claimed in claim 1, wherein the number of tonal components of said second signals of plural channels is detected based upon the information on the sum of widths of the second signal components in the encoding unit and the information on the width of the encoding unit.

6. The signal encoding method as claimed in claim 5, wherein the encoding unit divides the total number of bits available for bit allocation between a fixed bit allocation pattern pre-set for each small block and a block-based signal magnitude dependent bit allocation.

7. The signal encoding method as claimed in claim 1, wherein the second signals handled in common for plural channels are further separated into third signals made up of the second tonal components having a magnitude of at least a second pre-set level and fourth signals made up of the non-tonal components having a magnitude less than the second pre-set level.

8. A signal encoding apparatus for encoding input signals of plural channels, comprising:
   means for transforming the input signals into frequency components;
   means for separating said frequency components into first signals made up of first tonal components having a magnitude of at least a first pre-set level and second signals made up of second tonal components and non-tonal components, the components of the second signals having a magnitude of less than the first pre-set level;
   means for encoding the first and second signals;
   means for detecting a number of tonal components of said second signals of plural channels; and
   means for encoding said second signals of plural channels by handling them in common based upon the results of detection.

9. The signal encoding apparatus as claimed in claim 8, wherein said encoding means comprises individual encoding means for individually encoding the second signals of plural channels, common encoding means for encoding the second signals of plural channels in common, and selection means for selecting one of said individual encoding means and said common encoding means based upon an output of said detection means.

10. The signal encoding apparatus as claimed in claim 9, wherein selection by said selection means between the individual encoding and the common encoding based upon an output of said detection means is done from one encoding unit to another.

11. The signal encoding apparatus as claimed in claim 10, wherein the encoding unit divides the total number of bits available for bit allocation between a fixed bit allocation pattern pre-set for each small block and a block-based signal magnitude dependent bit allocation.

12. The signal encoding apparatus as claimed in claim 8, wherein detection by said detection means is done based upon the information on the sum of the widths of the second signal components in an encoding unit and the information on the pre-set bandwidth of said encoding unit.

13. The signal encoding apparatus as claimed in claim 12, wherein the encoding unit divides the total number of bits available for bit allocation between a fixed bit allocation pattern pre-set for each small block and a block-based signal magnitude dependent bit allocation.

14. The signal encoding apparatus as claimed in claim 8, further comprising separating means for separating the second signals handled in common for plural channels into third signals made up of the second tonal components having a magnitude of at least a second pre-set level and fourth signals made up of the non-tonal components having a magnitude less than the second pre-set level, an encoding unit for encoding said third signals, and an encoding unit for encoding said fourth signals.

15. A signal decoding method for decoding an encoded signal encoded from first signals of plural channels made up of first tonal components having a magnitude of at least a first pre-set level and an encoded signal encoded in common from second signals of plural channels made up of second tonal and non-tonal components, the components of the second signals having a magnitude less than the first pre-set level based upon the results of detection of a number of tonal components of said second signals of plural channels, said first and second signals having been separated from frequency components of plural channels, comprising the steps of:

decoding the encoded first signal of plural channels, and decoding the encoded second signal of plural channels based upon the results of detection of the signals' number of tonal components during encoding.

16. The signal decoding method as claimed in claim 15, wherein the encoded second signals are signals derived from selective switching between the common encoding of second signals of plural channels and individual encoding of individually encoding second signals of plural channels based upon the results of detection of the number of tonal components of the second signals of plural channels, and wherein, for decoding the encoded second signals, selective switching is made between decoding of the common encoded signals and decoding of individually encoded signals based upon the result of detection of the number of tonal components during decoding.

17. The signal decoding method as claimed in claim 16, wherein selective switching between the individual decoding and the common encoding is done from one encoding unit to another.

18. The signal decoding method as claimed in claim 17, wherein the encoding unit divides the total number of bits available for bit allocation between a fixed bit allocation pattern pre-set for each small block and a block-based signal magnitude dependent bit allocation.

19. The signal decoding method as claimed in claim 15, wherein the encoded second signals are signals encoded after separation of the second signals handled in common in plural channels into third signals made up of the second tonal components having a magnitude of at least a second pre-set level and fourth signals made up of the non-tonal components having a magnitude less than the second pre-set level, and wherein the encoded second signals are decoded by decoding the third signals and the fourth signals made up of other components.

20. A signal decoding apparatus for decoding an encoded signal encoded from first signals of plural channels made up of first tonal components having a magnitude of at least a first pre-set level and an encoded signal encoded in common from second signals of plural-channels made up of second tonal and non-tonal components, the components of the second signals having a magnitude less than the first pre-set level based upon the results of detection of a number of tonal components of said second signals of plural channels, said first and second signals having been separated from frequency components of plural channels, comprising:

first decoding means for decoding the encoded first signals of plural channels, and second means for decoding the encoded second signal of plural channels based upon the results of detection of the number of tonal components of the encoded second signals.

21. The signal decoding apparatus as claimed in claim 20, wherein the encoded second signals are signals derived from selective switching between the common encoding of second signals of plural channels and individual encoding of individually encoding second signals of plural channels based upon the results of detection of the the number of tonal components of the second signals of plural channels, and wherein the second decoding means has common decoding means for decoding signals encoded in common, individual decoding means for decoding signals encoded individually, and selection means for selecting said individual decoding means or the common decoding means based upon the results of detection of the number of tonal components during encoding.

22. The signal decoding apparatus as claimed in claim 21, wherein selective switching by said selection means between the individual decoding and the common encoding is done from one encoding unit to another.

23. The signal decoding apparatus as claimed in claim 22, wherein the encoding unit divides the total number of bits available for bit allocation between a fixed bit allocation pattern pre-set for each small block and a block-based signal magnitude dependent bit allocation.

24. The signal decoding apparatus as claimed in claim 20, wherein the encoded second signals are signals encoded after separation of the second signals handled in common in plural channels into third signals made up of the second tonal components having a magnitude of at least a second pre-set level and fourth signals made up of the non-tonal components having a magnitude less than the second pre-set level, wherein the encoded second signals are decoded by decoding the third and the fourth signals, and wherein said second decoding means has third decoding means for decoding said encoded third signals, and fourth decoding means for decoding said encoded fourth signals.

25. A recording medium in which are recorded, along with encoded signals of first signals made up of first tonal components, encoded signals of second signals made up of second tonal and non-tonal components, said first and second signals having been separated from frequency components transformed from input signals of plural channels, said second signals having been encoded in common based upon results of detection of a number of tonal components thereof.

26. A signal transmitting method for transmitting input signals of plural channels by transforming the input signals into frequency components, separating said frequency components into first signals made up of tonal components and second signals made up of non-tonal components and encoding the first and second signals, comprising the steps of:

transmitting first encoded signals obtained on encoding said first signals of plural channels from one channel to another, transmitting second encoded signals obtained on encoding the second signals of plural channels or third encoded signals obtained on common encoding of said second signal of plural channels, and transmitting the information indicating whether or not the second signal of plural channels have been encoded in common.

27. A signal encoding method for encoding input signals of plural channels, comprising the steps of:

transforming the input signals into frequency components;

separating said frequency components into first signals made up of first tonal components having a steep spectral distribution and second signals made up of second tonal and non-tonal components, the components of the second signals having a spectral distribution flatter than that of the first tonal components;

encoding the first and second signals;

detecting a number of tonal components of said second signals of plural channels;

encoding said second signals of plural channels by handling them in common based upon the results of detection.

28. The signal encoding method as claimed in claim 27, wherein selective switching is made, based upon the results of detection, between individual encoding for encoding the second signal of plural channels and common encoding for encoding the second signals of plural channels.

29. The signal encoding method as claimed in claim 28, wherein selective switching between said individual encoding and said common encoding based upon the results of detection is carried out from one encoding unit to another.

30. The signal encoding method as claimed in claim 29, wherein the encoding unit divides the total number of bits available for bit allocation between a fixed bit allocation pattern pre-set for each small block and a block-based signal magnitude dependent bit allocation.

31. The signal encoding method as claimed in claim 27, wherein the number of tonal components is detected based upon the information on the sum of widths of the second signal components in an encoding unit and the information on the width of the encoding unit.

32. The signal encoding method as claimed in claim 31, wherein the encoding unit divides the total number of bits available for bit allocation between a fixed bit allocation pattern pre-set for each small block and a block-based signal magnitude dependent bit allocation.

33. The signal encoding method as claimed in claim 27, wherein the second signals handled in common for plural channels are further separated into third signals made up of the second tonal components having a steep spectral distribution and fourth signals made up of the non-tonal components having a spectral distribution flatter than that of the second tonal components.

34. A signal encoding apparatus for encoding input signals of plural channels, comprising:

means for transforming the input signals into frequency components;

means for separating said frequency components into first signals made up of first tonal components having a steep spectral distribution and second signals made up of second tonal and non-tonal components, the components of the second signals having a spectral distribution flatter than that of the first tonal components;

means for encoding the first and second signals;

means for detecting a number of tonal components of said second signals of plural channels; and means for encoding said second signals of plural channels by handling them in common based upon the results of detection.

35. The signal encoding apparatus as claimed in claim 34, wherein said encoding means comprises individual encoding means for individually encoding the second signals of plural channels, common encoding means for encoding the second signals of plural channels in common, and selection means for selecting one of said individual encoding means and said common encoding means based upon an output of said detection means.

36. The signal encoding apparatus as claimed in claim 35, wherein selection by said selection means between the individual encoding and the common encoding based upon an output of said detection means is done from one encoding unit to another.

37. The signal encoding apparatus as claimed in claim 36, wherein the encoding unit divides the total number of bits available for bit allocation between a fixed bit allocation pattern pre-set for each small block and a block-based signal magnitude dependent bit allocation.

38. The signal encoding apparatus as claimed in claim 34, wherein detection by said detection means is done based upon the information on the sum of widths of the second signal components in an encoding unit and the information on the width of said encoding unit.

39. The signal encoding apparatus as claimed in claim 38, wherein the encoding unit divides the total number of bits available for bit allocation between a fixed bit allocation pattern pre-set for each small block and a block-based signal magnitude dependent bit allocation.

40. The signal encoding apparatus as claimed in claim 34, further comprising:

separating means for separating the second signals handled in common for plural channels into third signals made up of the second tonal components having a steep spectral distribution and fourth signals made up of the non-tonal components having a spectral distribution flatter than that of the second tonal components;

an encoding unit for encoding said third signals; and an encoding unit for encoding said fourth signals.

41. A signal decoding method for decoding an encoded signal encoded from first signals of plural channels made up of first tonal components having a steep spectral distribution and an encoded signal encoded in common from second signals of plural channels made up of second tonal and non-tonal components, the components of the second signals having a spectral distribution flatter than that of the first tonal components based upon the results of detection of a number of tonal components of said second signals of plural channels, said first and second signals having been separated from frequency components of plural channels, comprising the steps of:

decoding the encoded first signal of plural channels, and decoding the encoded second signal of plural channels based upon the results of detection of the signals' number of tonal components during encoding.

42. The signal decoding method as claimed in claim 41, wherein the encoded second signals are signals encoded after separation of the second signals handled in common in plural channels into third signals made up of the second tonal components having a steep spectral distribution and fourth signals made up of the non-tonal components having a spectral distribution flatter than that of the second tonal components, and wherein the encoded second signals are decoded by decoding the third signals and the fourth signals.

43. The signal decoding method as claimed in claim 42, wherein selective switching between the individual decoding and the common encoding is done from one encoding unit to another.

44. The signal decoding method as claimed in claim 43, wherein the encoding unit divides the total number of bits available for bit allocation between a fixed bit allocation pattern pre-set for each small block and a block-based signal magnitude dependent bit allocation.

45. The signal decoding method as claimed in claim 42, wherein the encoded second signals are signals encoded after separation of the second signals handled in common in plural channels into third signals made up of the second tonal components having a steep spectral distribution and fourth signals made up of the non-tonal components having a spectral distribution flatter than that of the second tonal components, and wherein the encoded second signals are decoded by decoding the third signals and the fourth signals.

46. A signal decoding apparatus for decoding an encoded signal encoded from first signals of plural channels made up of first tonal components having a steep spectral distribution and an encoded signal encoded in common from second signals of plural-channels made up of second tonal and non-tonal components, the components of the second signals having a spectral distribution flatter than that of the first tonal components based upon the results of detection of a number of tonal components of said second signals of plural channels, said first and second signals having been separated from frequency components of plural channels, comprising first decoding means for decoding the encoded first signal of plural channels, and second means for decoding the encoded second signal of plural channels based upon the results of detection of the signals' number of tonal components during encoding.

47. The signal decoding apparatus as claimed in claim 46, wherein the encoded second signals are signals derived from selective switching between the common encoding of second signals of plural channels and individual encoding of individually encoding second signals of plural channels based upon the results of detection of the number of tonal components of the second signals of plural channels, and wherein the second decoding means has common decoding means for decoding signals encoded in common, individual decoding means for decoding signals encoded individually, and selection means for selecting said individual decoding means or the common decoding means based upon the results of detection of the number of tonal components during encoding.

48. The signal decoding apparatus as claimed in claim 47, wherein selective switching by said selection means between the individual decoding and the common encoding is done from one encoding unit to another.

49. Then signal decoding apparatus as claimed in claim 48, wherein the encoding unit divides the total number of bits available for bit allocation between a fixed bit allocation pattern pre-set for each small block and a block-based signal magnitude dependent bit allocation.

50. The signal decoding apparatus as claimed in claim 46, wherein the encoded second signals are signals encoded after separation of the second signals handled in common in plural channels into third signals made up of the second tonal components having a steep spectral distribution and fourth signals made up of the non-tonal components having a spectral distribution flatter than that of the second tonal components, wherein the encoded second signals are decoded by decoding the third signals and the fourth signals, and wherein said second decoding means has third decoding means for decoding said encoded third signals, and fourth decoding means for decoding said encoded fourth signals.

* * * * *